(12) United States Patent
Kawamura et al.

(10) Patent No.: US 9,964,744 B2
(45) Date of Patent: May 8, 2018

(54) ZOOM LENS AND IMAGE PICKUP APPARATUS USING THE SAME

(71) Applicant: OLYMPUS CORPORATION, Tokyo (JP)

(72) Inventors: Kazuteru Kawamura, Tokyo (JP); Akiko Naito, Tokyo (JP); Keitaro Yokoyama, Tokyo (JP); Toshio Takahashi, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 231 days.

(21) Appl. No.: 14/857,206

(22) Filed: Sep. 17, 2015

(65) Prior Publication Data

US 2016/0004054 A1    Jan. 7, 2016

Related U.S. Application Data

(63) Continuation of application No. PCT/JP2014/057061, filed on Mar. 17, 2014.

(30) Foreign Application Priority Data

Jun. 21, 2013    (JP) ................................. 2013-130741

(51) Int. Cl.
*G02B 15/14* (2006.01)
*G02B 13/18* (2006.01)
(Continued)

(52) U.S. Cl.
CPC ........... *G02B 15/163* (2013.01); *G02B 5/005* (2013.01); *G02B 13/18* (2013.01); *G02B 15/177* (2013.01);
(Continued)

(58) Field of Classification Search
CPC .. G02B 13/0045; G02B 27/0025; G02B 9/60; G02B 13/18; G02B 15/177;
(Continued)

(56) References Cited

U.S. PATENT DOCUMENTS 7,869,135 B2    1/2011  Nishimura
8,203,799 B2    6/2012  Mihara et al.
(Continued)

FOREIGN PATENT DOCUMENTS

JP    10-325923    12/1998
JP    2008-176271    7/2008
(Continued)

OTHER PUBLICATIONS

International Preliminary Report on Patentability, dated Dec. 30, 2015, issued in corresponding International Application No. PCT/JP2014/057061.
(Continued)

*Primary Examiner* — Evelyn A Lester
(74) *Attorney, Agent, or Firm* — Hunton Andrews Kurth LLP

(57) ABSTRACT

A zoom lens comprises four lens unit, and at the time of zooming, each of a distance between a first positive lens unit and a first negative lens unit and a distance between a second negative lens unit and a second positive lens unit changes, and a distance between the first positive lens unit and the second negative lens unit widens more at the telephoto end than at the wide angle end, and the first positive lens unit includes an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to an image in the first negative lens unit is concave toward the image (Continued)

side, and a refracting surface nearest to an object in the second positive lens unit is concave toward the object side, and a refracting surface nearest to the image in the second positive lens unit is convex toward the image side, and the zoom lens satisfies predetermined conditional expressions.

38 Claims, 18 Drawing Sheets

(51) Int. Cl.

| | | |
|---|---|---|
| *G02B 9/60* | (2006.01) |
| *G02B 15/163* | (2006.01) |
| *G02B 15/177* | (2006.01) |
| *G02B 5/00* | (2006.01) |
| *G02B 27/00* | (2006.01) |
| *H04N 5/225* | (2006.01) |
| *H04N 5/262* | (2006.01) |
| *G02B 7/10* | (2006.01) |
| *G02B 13/00* | (2006.01) |
| *G02B 9/34* | (2006.01) |
| *G02B 15/16* | (2006.01) |
| *G02B 15/20* | (2006.01) |
| *G02B 9/00* | (2006.01) |
| *G02B 13/04* | (2006.01) |

(52) U.S. Cl.
CPC ....... *G02B 27/0025* (2013.01); *H04N 5/2254* (2013.01); *H04N 5/2628* (2013.01); *G02B 7/10* (2013.01); *G02B 9/00* (2013.01); *G02B 9/34* (2013.01); *G02B 9/60* (2013.01); *G02B 13/004* (2013.01); *G02B 13/009* (2013.01); *G02B 13/0015* (2013.01); *G02B 13/0045* (2013.01); *G02B 13/04* (2013.01); *G02B 15/14* (2013.01); *G02B 15/16* (2013.01); *G02B 15/20* (2013.01)

(58) Field of Classification Search
CPC .... G02B 13/004; G02B 15/20; G02B 13/009; G02B 13/04; G02B 15/16; G02B 5/005; G02B 9/34; G02B 15/14; G02B 13/0015; G02B 15/163; G02B 3/04; G02B 9/00; G02B 7/10
USPC ........ 359/680–686, 714, 715, 740, 749–753, 359/766, 781
See application file for complete search history.

(56) References Cited

U.S. PATENT DOCUMENTS

| | | |
|---|---|---|
| 8,446,512 B2 | 5/2013 | Ichikawa et al. |
| 8,564,888 B2 | 10/2013 | Matsuo et al. |
| 8,659,836 B2 | 2/2014 | Imaoka |
| 8,743,471 B2 | 6/2014 | Imaoka |
| 2011/0273780 A1* | 11/2011 | Hosoi .................. G02B 15/173 359/690 |
| 2012/0275032 A1 | 11/2012 | Shibata et al. |
| 2013/0027585 A1 | 1/2013 | Souma |

FOREIGN PATENT DOCUMENTS

| | | |
|---|---|---|
| JP | 2010-128145 | 6/2010 |
| JP | 2011-053621 | 3/2011 |
| JP | 2011-059599 | 3/2011 |
| JP | 2011-095488 | 5/2011 |
| JP | 2012-058406 | 3/2012 |
| JP | 2012-123031 | 6/2012 |
| JP | 2012-133228 | 7/2012 |
| JP | 2012-133230 | 7/2012 |
| JP | 2012-181350 | 9/2012 |
| JP | 2013-015778 | 1/2013 |
| JP | 2013-105142 | 5/2013 |

OTHER PUBLICATIONS

International Search Report, dated Jun. 17, 2014, issued in corresponding International Application No. PCT/JP2014/057061.

* cited by examiner

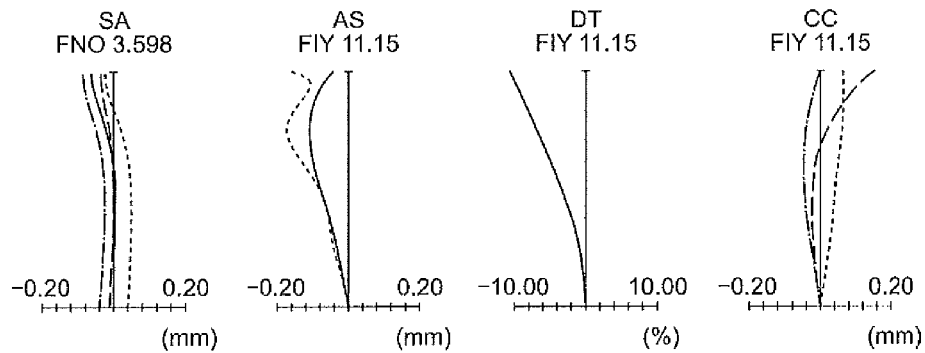
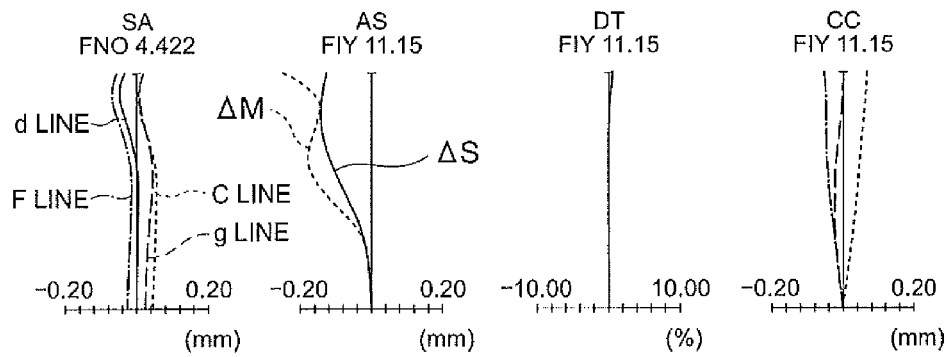
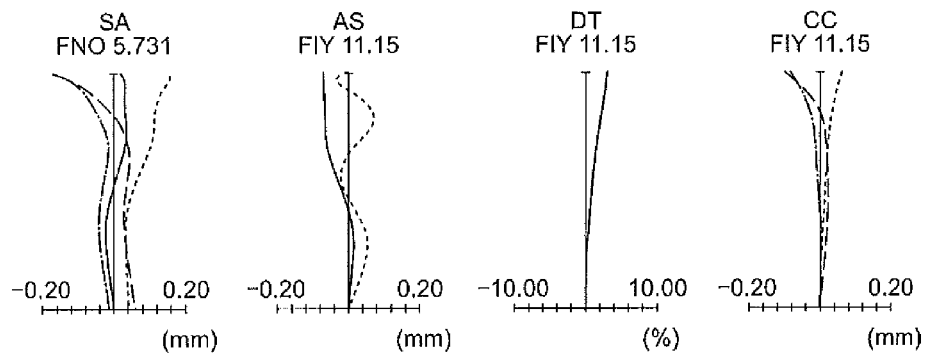

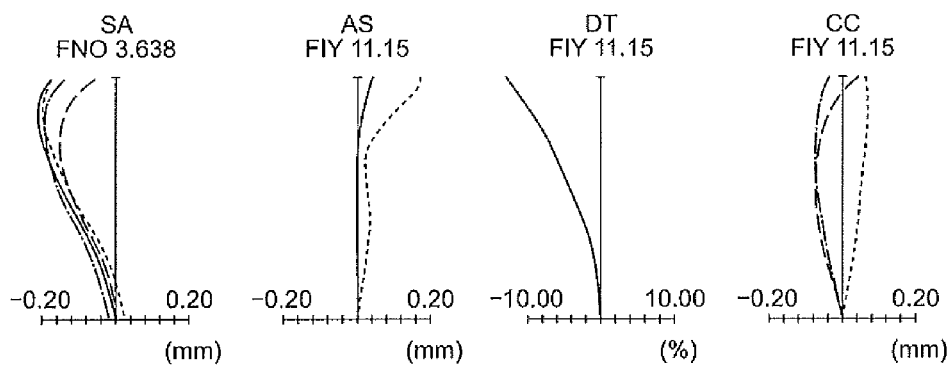
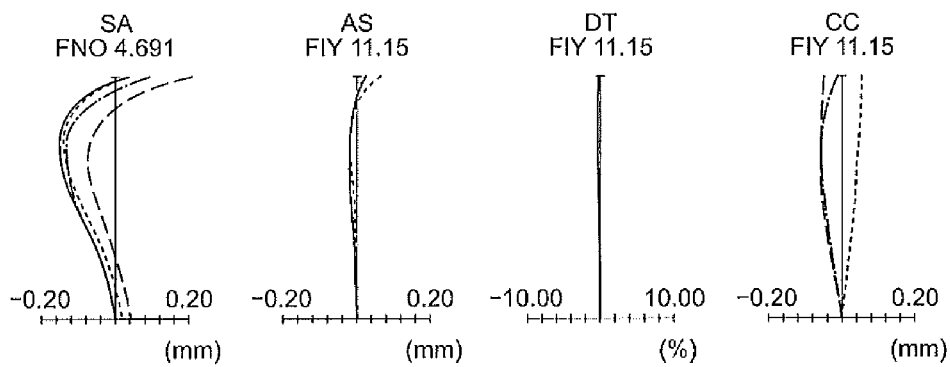
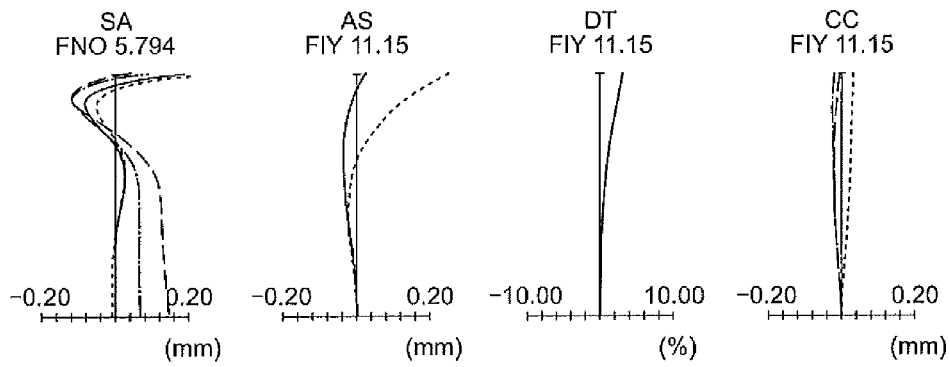

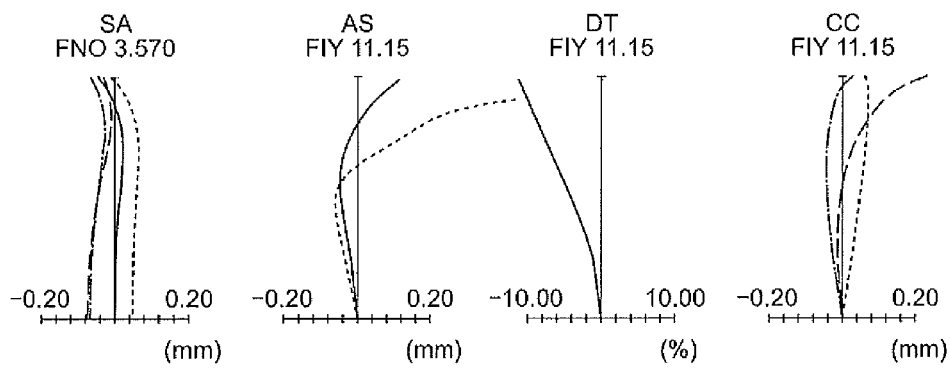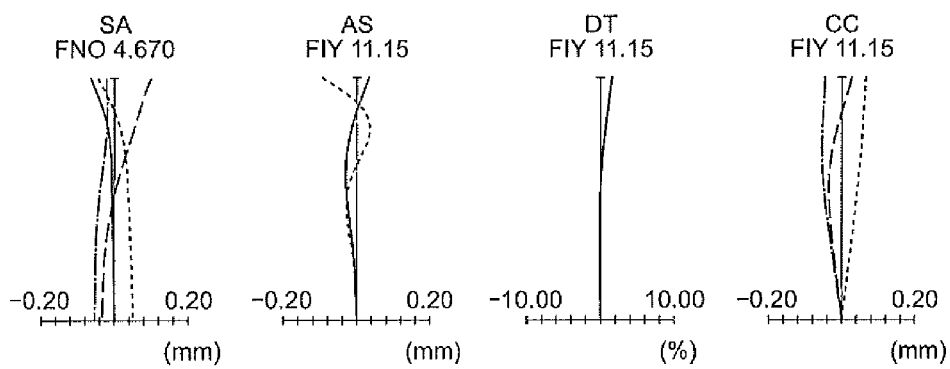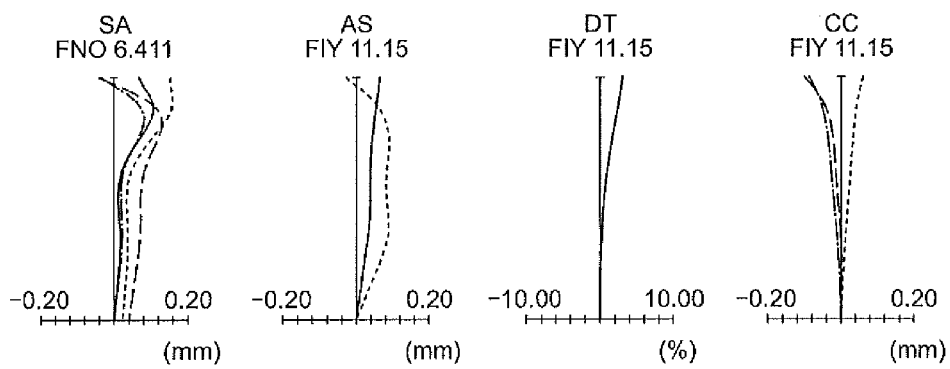

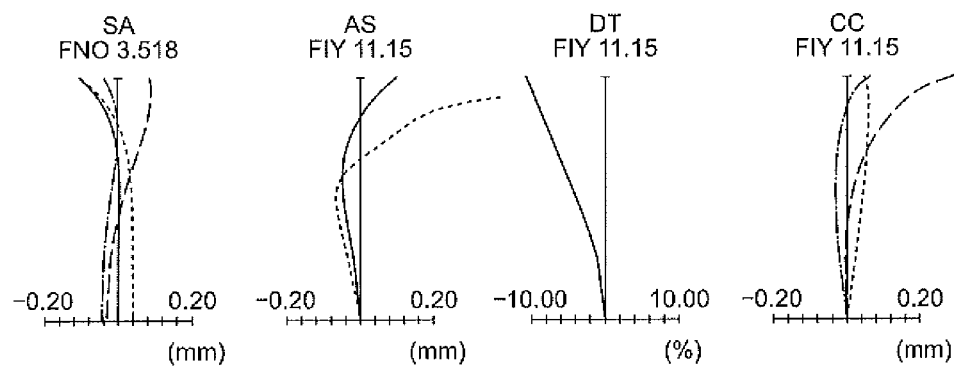
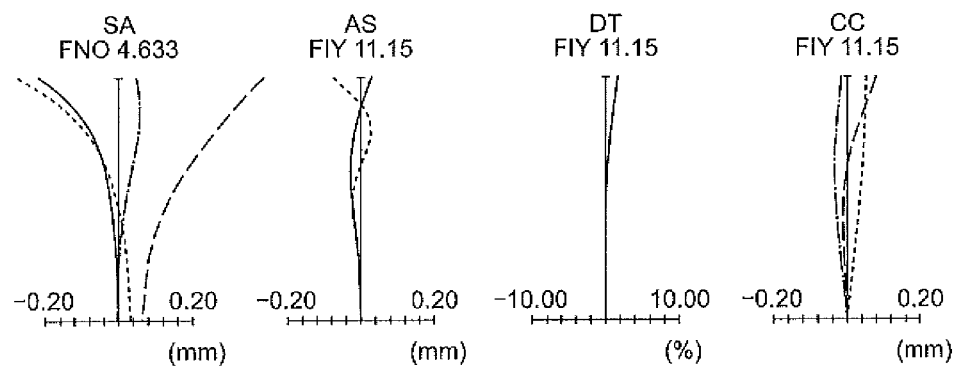
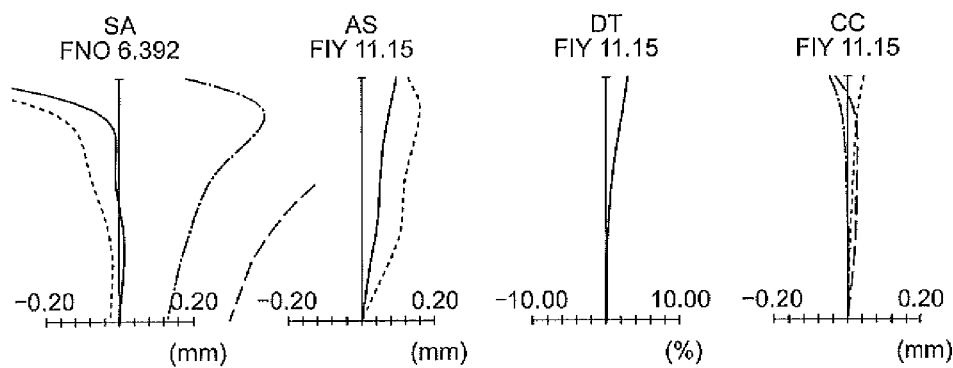

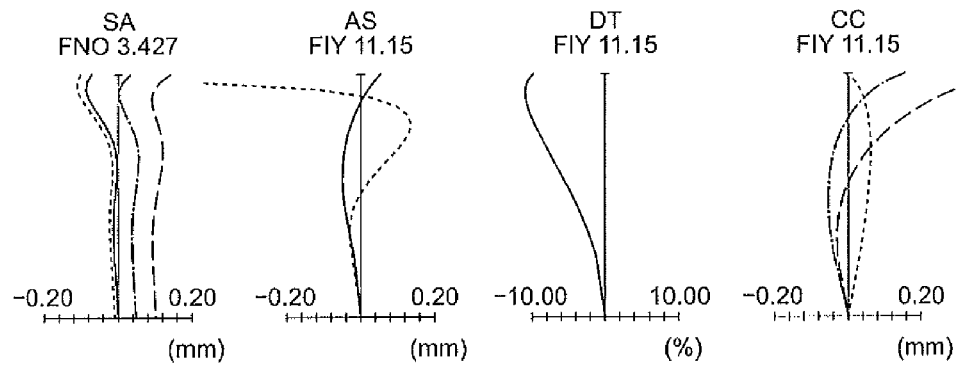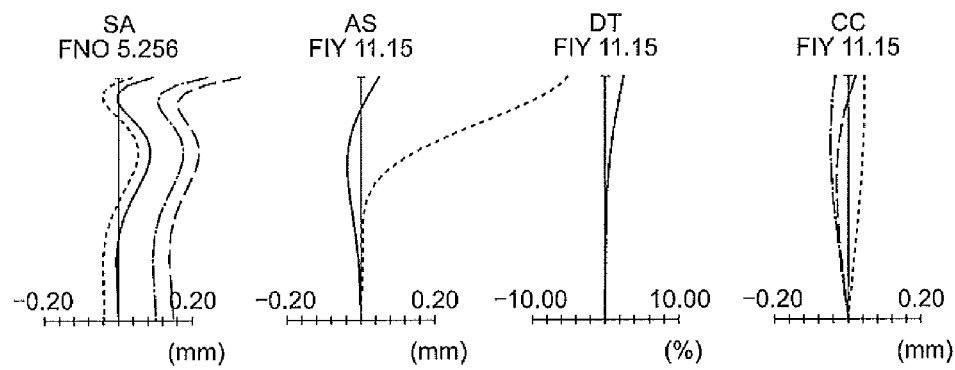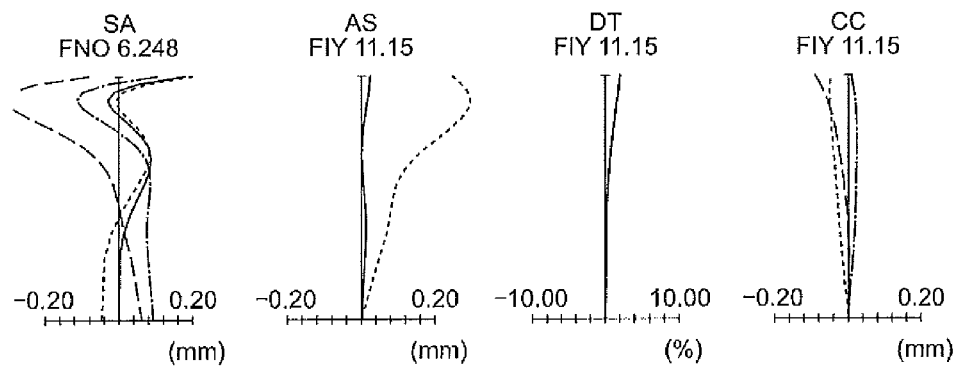

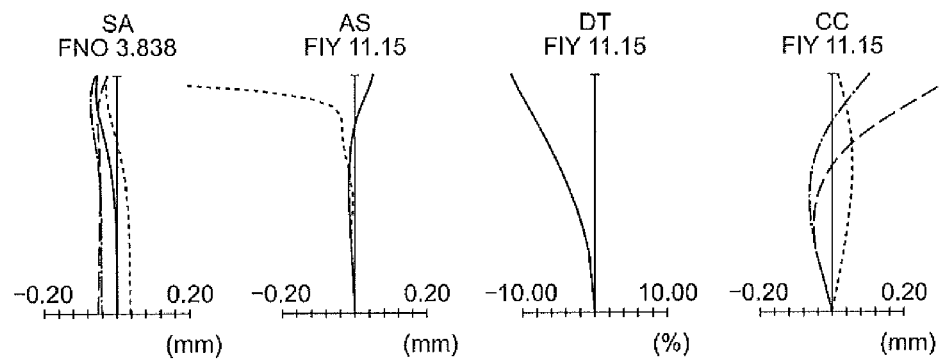
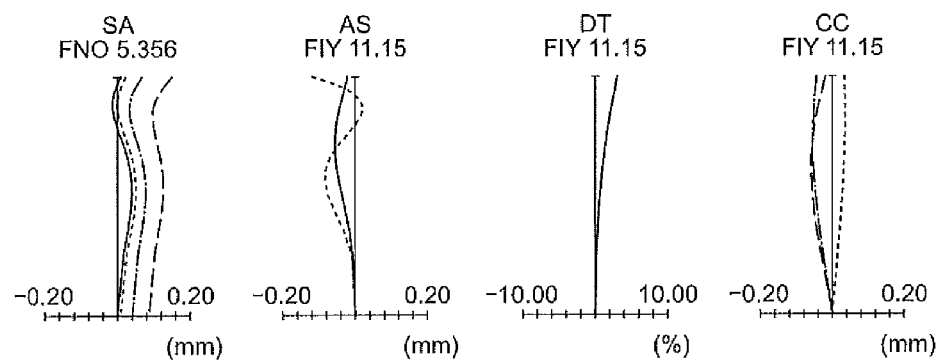
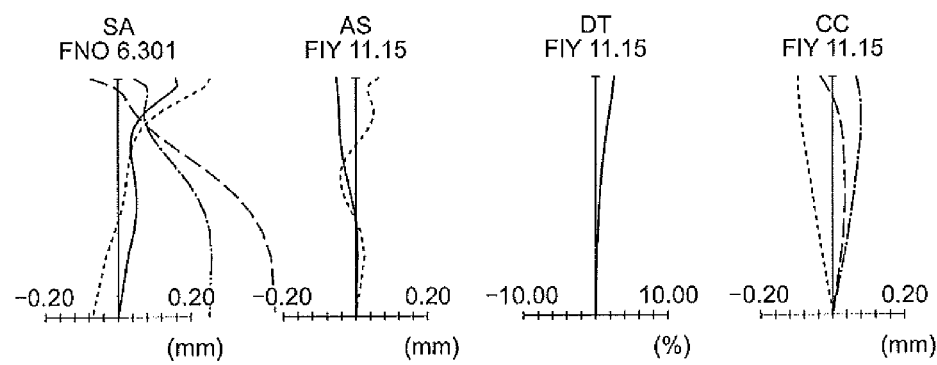

ZOOM LENS AND IMAGE PICKUP APPARATUS USING THE SAME

CROSS-REFERENCE TO RELATED APPLICATION

The present application is a continuation of PCT/JP2014/057061, filed on Mar. 17, 2014 which is based upon and claims the benefit of priority from Japanese Patent Application No. 2013-130741 filed on Jun. 21, 2013; the entire contents of which are incorporated herein by reference.

BACKGROUND OF THE INVENTION

Field of the Invention

The present invention relates to a zoom lens and an image pickup apparatus using the same.

Description of the Related Art

Zoom lenses to be used in cameras have hitherto been known. Particularly, a zoom lens to be used in an interchangeable lens that is mounted on a camera main body has been known.

In a zoom lens of this field, an improvement in an image quality is facilitated by making an image pickup surface area of an image pickup element large and small-sizing of an overall camera is carried out by making the image pickup surface area small. Here, when an area of image pickup surface of the image pickup element is large, a zoom lens to be used therein also becomes large. Therefore, a zoom lens in which, both an image quality and portability are achieved by small-sizing the zoom lens while securing the area of the image pickup surface, has been sought.

In view of such circumstances, zoom lenses which include lens units of refractive power in order of a negative refractive power, a positive refractive power, a negative refractive power, and a positive refractive power from an object side, and have a comparatively small size, and in which, wide angle of view in a wide angle end is secured have been disclosed in Japanese Patent Application Laid-open Publication No. 2012-133230 and Japanese Patent Application Laid-open Publication No. 2012-58406.

SUMMARY OF THE INVENTION

A zoom lens according to the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image in the first negative lens unit is concave toward the image side, and a refracting surface nearest to the object in the second positive lens unit is concave toward the object side, and a refracting surface nearest to the image in the second positive lens unit is convex toward the image side, and the following conditional expression (1) is satisfied:

$$1.2 < \Sigma_{1P}/ER_S < 2.7 \quad (1)$$

where, $\Sigma_{1P}$ denotes a thickness on an optical axis of the first positive lens unit, and $ER_S$ denotes a maximum radius of an opening portion of the aperture stop.

Another zoom lens according to the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image in the first negative lens unit is concave toward the image side, and a refracting surface nearest to the object in the second positive lens unit is concave toward the object side, and a refracting surface nearest to the image in the second positive lens unit is convex toward the image side, and the following conditional expression (2) is satisfied:

$$0.4 < \Sigma_{1P}/f_w < 1.2 \quad (2)$$

where, $\Sigma_{1P}$ denotes a thickness on an optical axis of the first positive lens unit, and $f_w$ denotes a focal length of the overall zoom lens system at the time of focusing on an axial infinite object point at the wide angle end.

Still another zoom lens according to the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image in the first negative lens unit is concave toward the image side, and the first negative lens unit includes in order from the object side to the image side, an object-side sub-lens unit that includes a first negative lens, and an image-side sub-lens unit that includes a second negative lens and a first positive lens, and the following conditional expressions (1) and (3) are satisfied:

$$1.2<\Sigma_{1P}/ER_S<2.7 \quad (1)$$

$$-0.9<SF_{2N}<1.5 \quad (3)$$

where, $\Sigma_{1P}$ denotes a thickness on an optical axis of the first positive lens unit, $ER_S$ denotes a maximum radius of an opening portion of the aperture stop, $$SF_{2N}=(R_{2NO}+R_{2NI})/(R_{2NO}-R_{2NI})$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit.

Still another zoom lens according the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image side in the first negative lens unit is concave toward the image side, and the first negative lens unit includes in order from the object side to the image side, an object-side sub-lens unit which includes a first negative lens, and an image-side sub-lens unit which includes a second negative lens and a first positive lens, and the following conditional expressions (2) and (3) are satisfied:

$$0.4<\Sigma_{1P}/f_w<1.2 \quad (2)$$

$$-0.9<SF_{2N}<1.5 \quad (3)$$

where, $\Sigma_{1P}$ denotes a thickness on an optical axis of the first positive lens unit, $f_w$ denotes a focal length of the overall zoom lens system at the time of focusing on an axial infinite object point at the wide angle end, $$SF_{2N}=(R_{2NO}+R_{2NI})/(R_{2NO}-R_{2NI}),$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit.

Still another zoom lens according to the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit include in order from the object side to the image side, two sub-lens unit namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image side in the first negative lens unit is concave toward the image side, and the following conditional expressions (1) and (4) are satisfied:

$$1.2<\Sigma_{1P}/ER_S<2.7 \quad (1)$$

$$1.0<|f_{2N}/f_{1P}|<1.9 \quad (4)$$

where, $\Sigma_{1P}$ denotes a thickness on an optical axis of the first positive lens unit, $ER_S$ denotes a maximum radius of an opening portion of the aperture stop, $f_{1P}$ denotes a focal length of the first positive lens unit, and $f_{2N}$ denotes a focal length of the second negative lens unit.

Still another zoom lens according to the present invention comprises;

a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image side in the first negative lens unit is concave toward the image side, and the following conditional expressions (2) and (4) are satisfied:

$$0.4 < \Sigma_{1P}/f_w < 1.2 \quad (2)$$

$$1.0 < |f_{2N}/f_{1P}| < 1.9 \quad (4)$$

where, $\Sigma_{1P}$ denotes a thickness on an optical axis of the first positive lens unit, $f_w$ denotes a focal length of the overall zoom lens system at the time of focusing on an axial infinite object point at the wide angle end, $f_{1P}$ denotes a focal length of the first positive lens unit, and $f_{2N}$ denotes a focal length of the second negative lens unit.

An image pickup apparatus according to the present invention comprises a zoom lens, and an image pickup element which has an image pickup surface, and which converts an image formed on the image pickup surface by the zoom lens to an electric signal, wherein the zoom lens is anyone of the aforementioned zoom lenses.

BRIEF DESCRIPTION OF THE DRAWINGS

FIG. 1A is a lens cross-sectional view at a wide angle end, FIG. 1B is a lens cross-sectional view in an intermediate state, and FIG. 1C is a lens cross-sectional view at a telephoto end;

FIG. 2A is a lens cross-sectional view at a wide angle end, FIG. 2B is a lens cross-sectional view in an intermediate state, and FIG. 2C is a lens cross-sectional view at a telephoto end;

FIG. 3A is a lens cross-sectional view at a wide angle end, FIG. 3B is a lens cross-sectional view in an intermediate state, and FIG. 3C is a lens cross-sectional view at a telephoto end;

FIG. 4A is a lens cross-sectional view at a wide angle end, FIG. 4B is a lens cross-sectional view in an intermediate state, and FIG. 4C is a lens cross-sectional view at a telephoto end;

FIG. 5A is a lens cross-sectional view at a wide angle end, FIG. 5B is a lens cross-sectional view in an intermediate state, and FIG. 5C is a lens cross-sectional view at a telephoto end;

FIG. 6A is a lens cross-sectional view at a wide angle end, FIG. 6B is a lens cross-sectional view in an intermediate state, and FIG. 6C is a lens cross-sectional view at a telephoto end;

FIG. 7A, FIG. 7B, FIG. 7C, FIG. 7D, FIG. 7E, FIG. 7F, FIG. 7G, FIG. 7H, FIG. 7I, FIG. 7J, FIG. 7K, and FIG. 7L (hereinafter, 'FIG. 7A to FIG. 7L') are aberration diagrams at the time of focusing on an infinite object point of the zoom lens of the example 1;

FIG. 8A, FIG. 8B, FIG. 8C, FIG. 8D, FIG. 8E, FIG. 8F, FIG. 8G, FIG. 8H, FIG. 8I, FIG. 8J, FIG. 8K, and FIG. 8L (hereinafter, 'FIG. 8A to FIG. 8L') are aberration diagrams at the time of focusing on an infinite object point of the zoom lens of the example 2;

FIG. 9A, FIG. 9B, FIG. 9C, FIG. 9D, FIG. 9E, FIG. 9F, FIG. 9G, FIG. 9H, FIG. 9I, FIG. 9J, FIG. 9K, and FIG. 9L (hereinafter, 'FIG. 9A to FIG. 9L') are aberration diagrams at the time of focusing on an infinite object point of the zoom lens of the example 3;

FIG. 10A, FIG. 10B, FIG. 10C, FIG. 10D, FIG. 10E, FIG. 10F, FIG. 10G, FIG. 10H, FIG. 10I, FIG. 10J, FIG. 10K, and FIG. 10L (hereinafter, 'FIG. 10A to FIG. 10L') are aberration diagrams at the time of focusing on an infinite object point of the zoom lens of the example 4;

FIG. 11A, FIG. 11B, FIG. 11C, FIG. 11D, FIG. 11E, FIG. 11F, FIG. 11G, FIG. 11H, FIG. 11I, FIG. 11J, FIG. 11K, and FIG. 11L (hereinafter, 'FIG. 11A to FIG. 11L') are aberration diagrams at the time of focusing on an infinite object point of the zoom lens of the example 5;

FIG. 12A, FIG. 12B, FIG. 12C, FIG. 12D, FIG. 12E, FIG. 12F, FIG. 12G, FIG. 12H, FIG. 12I, FIG. 12J, FIG. 12K, and FIG. 12L (hereinafter, 'FIG. 12A to FIG. 12L') are aberration diagrams at the time of focusing on an infinite object point of the zoom lens of the example 6;

DETAILED DESCRIPTION OF THE INVENTION

Figure 1A:
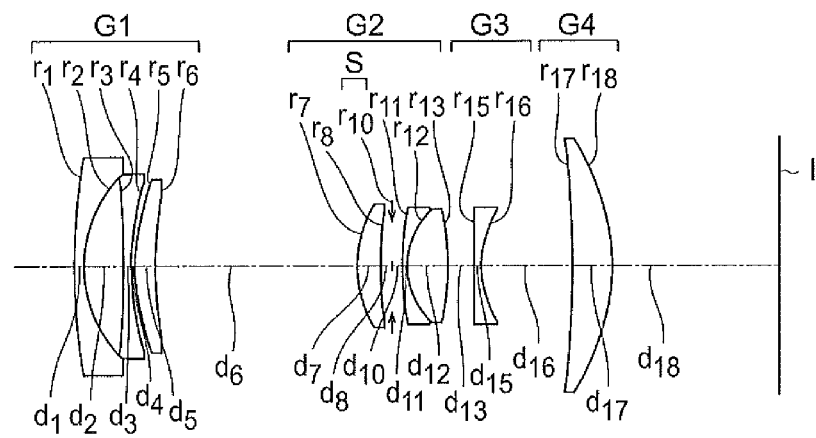
FIG. 1A, FIG. 1B, and FIG. 1C are lens cross-sectional views at the time of focusing on an infinite object point of a zoom lens of an example 1, where.

Exemplary embodiments and examples of a zoom lens according to the present invention, and an image pickup apparatus using the zoom lens will be described below in detail by referring to the accompanying diagrams. However, the present invention is not restricted to the embodiments and the examples described below.

In the zoom lens according to the present invention, a half angle of view of 33 degrees at a wide angle end, and furthermore, an angle of view of over 36 degrees is secured, and an overall length is shortened, and a zooming ratio of over 2.8 times is achieved. In order to achieve such spec, each lens unit is arranged to include a lesser number of lenses so that the overall length of lenses is not constrained, and an overall thickness of each lens unit is made small, and an arrangement is let to be such that as an optical system from the wide angle end up to a telephoto end, it is closer to a symmetric system.

An arrangement of a zoom lens according to an embodiment will be described below. First of all, a basic arrangement will be described below.

In the basic arrangement of the zoom lens of the embodiment, the zoom lens includes a first positive lens unit having a positive refractive power, a first negative lens unit having a negative refractive power, which is disposed immediately before an object side of the first positive lens unit, a second negative lens unit having a negative refractive power, which is disposed immediately after an image side of the first positive lens unit, and a second positive lens unit which is disposed nearest to an image, and at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, two sub-lens units namely an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image in the first negative lens unit is concave toward the image side.

By disposing the aperture stop in the first positive lens unit, and by disposing negative lens units (the first negative lens unit and the second negative lens unit) before and after the first positive lens unit, an arrangement is let to be optically symmetric. Accordingly, a change in an off-axis aberration due to zooming from the wide angle end to the telephoto end is reduced.

Moreover, by disposing the second positive lens unit nearest to the image, a magnifying optical system is formed by the second negative lens unit and the second positive lens unit, and a diameter of the overall lens system is made small. As a result, a performance is secured while shortening the overall length of the lens system with lesser number of lenses.

Furthermore, by changing the distance between the first positive lens unit and the second negative lens unit, a change in the overall length of the lens system due to zooming is made small.

Moreover, by making an abovementioned arrangement of the first negative lens unit, both reduction in aberration in the first negative lens unit and shortening of the lens system at the telephoto end and at the time when collapsed to be accommodated are achieved.

Next, preferable arrangements and preferable conditional expressions will be described below.

In the zoom lens of the embodiment, it is preferable that the refracting surface nearest to the object side in the second positive lens unit is concave toward the object side, and the refracting surface nearest to the image side in the second lens unit is convex toward the image side.

Accordingly, it is possible to suppress a curvature of field and a distortion, and it is possible to secure a favorable performance in the entire zoom range.

In the zoom lens of the embodiment, it is preferable that any of the following conditional expressions (1), (2), (5), (6), and (7) is satisfied:

$$1.2 < \Sigma_{1P}/ER_S < 2.7 \quad (1)$$

$$0.4 < \Sigma_{1P}/f_w < 1.2 \quad (2)$$

$$0.4 < \Sigma_{1P}/IH_{MAX} < 1.8 \quad (5)$$

$$0.45 < \Sigma_{1P}/IH_{33w} < 1.95 \quad (6)$$

$$0.4 < \Sigma_{1P}/f_{1P} < 1.0 \quad (7)$$

where, $\Sigma_{1P}$ denotes a thickness on an optical axis of the first positive lens unit, $ER_S$ denotes a maximum radius of an opening portion of the aperture stop, $f_w$ denotes a focal length of the overall zoom lens system at the time of focusing on an axial infinite object point at the wide angle end, $IH_{MAX}$ denotes a maximum image height of the zoom lens, and is a maximum value when it changes, $IH_{33w}$ denotes a distance from an optical axis up to a position at which, a paraxial image plane intersects with a principal light ray when a light-incidence side half angle of view of the zoom lens at the time of focusing on an axial infinite object point at the wide angle end becomes 33°, and $f_{1P}$ denotes a focal length of the first positive lens unit.

By making so as not to fall below a lower limit value of at least one of conditional expressions (1), (2), (5), (6), and (7), it becomes easy to suppress an over-tendency of the curvature of field, and the curvature of field over the total zoom range is made to be easily suppressible. Moreover, since it becomes easy to secure a sufficient positive refractive power of the first positive lens unit, it leads to making the overall length of the zoom lens small.

By making so as not to exceed an upper limit value of at least one of conditional expressions (1), (2), (5), (6), and (7), a thickness of the first positive lens unit is suppressed, which contributes to small-sizing.

In the zoom lens of the embodiment, it is preferable that the first negative lens unit includes in order from the object side to the image side, the object-side sub-lens unit which includes a first negative lens, and the image-side sub-lens unit which includes a second negative lens and a first positive lens.

By making the negative refractive power of the first negative lens large, an entrance pupil is brought closer to the object side, thereby enabling to contribute to securing an angel of view at the wide angle end and small-sizing. Although an astigmatism near the wide angle end, and a coma and a spherical aberration near the telephoto end are susceptible to occur, by letting the image-side sub-lens unit to have the abovementioned arrangement, an aberration in the overall first negative lens unit is suppressed, and a stable optical performance is achieved in the entire zoom range.

Moreover, by letting the first negative lens to be a negative meniscus lens having a convex surface directed toward the object side, the astigmatism and the coma occurring in the first negative lens are reduced, and an aberration reduction in the overall first lens unit is carried out.

In the zoom lens of the present embodiment, it is preferable that the following conditional expression (3) is satisfied:

$$-0.9 < SF_{2N} < 1.5 \tag{3}$$

where, $$SF_{2N} = (R_{2NO} + R_{2NI})/(R_{2NO} - R_{2NI}),$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit.

By making so as not to fall below a lower limit value of conditional expression (3), an arrangement is made such that an edge of an object-side surface of the second negative lens does not stick out excessively toward the first negative lens, and by making a distance between the first negative lens and the second negative lens small, it is possible to contribute to small-sizing of the first negative lens unit.

By making so as not to exceed an upper limit value of conditional expression (3), it becomes easy to achieve a sufficient correction effect with respect to the astigmatism at the object-side surface of the second negative lens.

In the zoom lens of the present embodiment, it is preferable that the following conditional expression (4) is satisfied:

$$1.0 < |f_{2N}/f_{1P}| < 1.9 \tag{4}$$

where, $f_{1P}$ denotes the focal length of the first positive lens unit, and $f_{2N}$ denotes a focal length of the second negative lens unit.

By making so as not to fall below a lower limit value of conditional expression (4), the negative refractive power of the second negative lens unit is made adequately small, thereby making it possible to shorten the overall length.

By making so as not to exceed an upper limit value of conditional expression (4), it is possible to secure sufficiently a correction effect with respect to the spherical aberration and the coma of the second lens unit, and it becomes easy to achieve a favorable performance in the entire zoom range.

In the zoom lens of the present embodiment, it is more preferable that the following conditional expression (4') is satisfied.

$$1.1 < |f_{2N}/f_{1P}| < 1.9 \tag{4'}$$

Moreover, in the zoom lens of the present embodiment, it is even more preferable that the following conditional expression (4") is satisfied.

$$1.2 < |f_{2N}/f_{1P}| < 1.9 \tag{4"}$$

An effect due to conditional expressions (4') and (4") is similar as the effect due to conditional expression (4).

In the zoom lens of the present embodiment, it is preferable that any one of the following conditional expressions (8), (9), and (10) is satisfied:

$$0.7 < f_{UN1P1}/IH_{MAX} < 2.8 \tag{8}$$

$$1.0 < f_{UN1P1}/IH_{33w} < 3.5 \tag{9}$$

$$0.7 < f_{UN1P1}/f_w < 2.0 \tag{10}$$

where, $f_{UN1P1}$ denotes a focal length of the object-side sub-lens unit in the first positive lens unit, $IH_{MAX}$ denotes the maximum image height of the zoom lens, and is the maximum height when it changes, $IH_{33w}$ denotes the distance from the optical axis up to the position at which, the paraxial image plane intersects with the principal light ray when the light-incidence side half angle of view of the zoom lens at the time of focusing on the axial infinite object point at the wide angle end becomes 33°, and $f_w$ denotes the focal length of the overall zoom lens system at the time of focusing on the axial infinite object point at the wide angle end.

By making so as not to fall below a lower limit value of at least one of conditional expressions (8), (9), and (10), an occurrence of the spherical aberration and the coma of the object-side sub-lens unit in the first positive lens unit is suppressed, and it becomes easy to cancel these aberrations in the image-side sub-lens unit, thereby enabling to improve the performance.

By making so as not to exceed an upper limit value of at least one of conditional expressions (8), (9), and (10), it becomes easy to make the positive refractive power of the first positive lens unit large, and it becomes possible to shorten the overall length.

In the zoom lens of the present embodiment, it is preferable that any one of the following conditional expressions (11), (12), and (13) is satisfied:

$$0.8 < |f_{2N}/IH_{MAX}| < 3.6 \tag{11}$$

$$1.5 < |f_{2N}/IH_{33w}| < 4.1 \tag{12}$$

$$1.0 < |f_{2N}/f_w| < 2.4 \tag{13}$$

where, $f_{2N}$ denotes the focal length of the second negative lens unit, $IH_{MAX}$ denotes the maximum image height of the zoom lens, and is the maximum height when it changes, $IH_{33w}$ denotes the distance from the optical axis up to the position at which, the paraxial image plane intersects with the principal light ray when the light-incidence side half angle of view of the zoom lens at the time of focusing on the axial infinite object point at the wide angle end becomes 33°, and $f_w$ denotes the focal length of the overall zoom lens system at the time of focusing on the axial infinite object point at the wide angle end.

By making so as not to fall below a lower limit value of at least one of conditional expressions (11), (12), and (13), and by making so as not to exceed an upper limit value of at least one of conditional expressions (11), (12), and (13), a balance of symmetry of a refractive power of the zoom lens becomes favorable, thereby enabling to contribute to correction of the spherical aberration and a curvature of field. This enables to contribute to securing a stable performance over the entire zoom range while securing the angle of view at the wide angle end.

In the zoom lens of the present embodiment, it is preferable that the object-side sub-lens unit in the first positive lens unit includes a positive lens, and the image-side sub-lens unit in the first positive lens unit includes a positive lens.

The first positive lens unit which includes the aperture stop is involved largely in the spherical aberration and the coma aberration. Therefore, by disposing a positive lens in each of the sub-lens units before and after the aperture stop, it is possible to improve an optical symmetry, and enables to contribute to reduction of the coma. Moreover, by securing an airspace for the aperture stop to be disposed, the astigmatism is reduced.

In the zoom lens of the present embodiment, it is preferable that the image-side sub-lens unit in the first positive lens unit includes a lens surface having a negative refractive power, and a positive lens that is disposed on an image side of the lens surface having a negative refractive power.

Accordingly, it is possible to improve further the symmetry of arrangement of refractive power of the zoom lens, and to improve an optical performance over the entire zoom range while carrying out small-sizing by making the positive refractive power of the first positive lens unit large.

In the zoom lens of the present embodiment, it is preferable that the object-side sub-lens unit in the first positive lens unit includes one lens component having a positive refractive power, and the image-side sub-lens unit in the first positive lens unit includes one lens component, and only two surfaces namely, an object-side surface and an image side surface of each of the lens component in the object-side sub-lens unit and the lens component in the image-side sub-lens unit are in contact with air, and the total number of lens components in the first positive lens unit is two.

Accordingly, it is possible to make the first positive lens unit small-sized.

In the zoom lens of the present embodiment, it is preferable that the following conditional expression (14) is satisfied:

$$0.35<f_{1N}/f_{2N}<1.2 \qquad (14)$$

where, $f_{1N}$ denotes a focal length of the first negative lens unit, and $f_{2N}$ denotes the focal length of the second negative lens unit.

By making so as not to fall below a lower limit value of conditional expression (14), the negative refractive power of the first negative lens unit is suppressed, thereby not allowing a large negative distortion to occur even when small-sizing is carried out.

By making so as not to exceed an upper limit value of conditional expression (14), the negative refractive power of the second negative lens unit is suppressed, thereby not allowing a large positive distortion to occur even when small-sizing is carried out.

Moreover, it becomes easy to reduce an occurrence of the chromatic aberration of magnification due to the second negative lens unit, thereby leading to small-sizing of the second negative lens unit and reduction in the number of lenses in the second negative lens unit.

In the zoom lens of the present embodiment, it is preferable that the following conditional expression (15) is satisfied:

$$-20.0\%<DT_w<-6.0\% \qquad (15)$$

where, $$DT_w=\{IH_w-f_w\times\tan(\omega_w)\}/\{f_w\times\tan(\omega_w)\}\times100(\%),$$

where, $f_w$ denotes the focal length of the overall zoom lens system at the time of focusing on an axial infinite object point at the wide angle end, $IH_w$ denotes a maximum image height of the zoom lens at the time of focusing on the axial infinite object point at the wide angle end, and $\omega_w$ denotes a half angle of view at the time of focusing on an axial infinite object point at the wide angle end of the zoom lens.

By making so as not to fall below a lower limit value of conditional expression (15), it is possible to reduce distortion of an image. Moreover, in a case in which, a distortion at the wide angle end is corrected electrically, a degradation of resolution in a peripheral area of a corrected image is suppressed.

By making so as not to exceed an upper limit value of conditional expression (15), it is possible to contribute to correction of astigmatism, and small-sizing of a lens unit nearest to an object.

In the zoom lens of the present embodiment, it is preferable that the following conditional expression (16) is satisfied:

$$0.7<f_{1P}/f_w<1.5 \qquad (16)$$

where, $f_{1P}$ denotes the focal length of the first positive lens unit, and $f_w$ denotes the focal length of the overall zoom lens system at the time of focusing on the axial infinite object point at the wide angle end.

By making so as not to fall below a lower limit value of conditional expression (16), the spherical aberration and the coma that occur in the first positive lens unit can be easily suppressed with lesser number of lenses, and it is possible to contribute to small-sizing in an optical axial direction of the first positive lens unit.

By making so as not to exceed an upper limit value of conditional expression (16), it is possible to contribute to both of securing the zooming ratio and shortening the overall length.

In the zoom lens of the present embodiment, it is preferable to dispose the second positive lens unit immediately after the image side of the second negative lens unit.

By such arrangement, an image that is formed from the object side up to the first positive lens unit is magnified by two lens units namely the second negative lens unit and the second positive lens unit. Letting an amount of movement of the first positive lens unit at the time of zooming to be large enables to secure the zooming ratio with the lesser number of lens units, and also a diameter of the lens unit nearest to the object is made small.

In the zoom lens of the present embodiment, it is preferable that the second negative lens unit includes a negative lens having a specific gravity larger than 0.9 g/cm³ and smaller than 1.3 g/cm³.

Accordingly, it is possible to make the zooming role of the second negative lens unit comparatively smaller. It is preferable to carry out focusing by moving the second negative lens unit along the optical axial direction, and to reduce image motion due to camera shake by shifting-movement of a lens unit.

By securing stiffness and light-weighting of the second negative lens unit by satisfying a condition of the specific gravity, it is possible to make focusing high-speed, and to improve followability of the shifting-movement of the lens unit with respect to the camera shake.

In the zoom lens of the present embodiment, it is preferable that the first positive lens unit includes a negative lens, and a positive lens that satisfies the following conditional expression (17):

$$63 < \nu_{p1} < 96 \qquad (17)$$

where, $\nu_{p1}$ denotes Abbe's number with reference to a d-line of one of the positive lenses in the first positive lens unit.

The first positive lens unit is positioned to be sandwiching the aperture stop, and has a substantial effect on the spherical aberration for each color. For correction of a longitudinal chromatic aberration, it is preferable to make a dispersion by a lens having a positive refractive power small and to make a dispersion by a lens having a negative refractive power large. However, for a lens having a large dispersion, an anomalous dispersibility is also large, and correction of the spherical aberration for each color becomes difficult. By satisfying conditional expression (17) it is possible to correct these aberrations favorably.

By letting the positive lens in the first positive lens unit have a low dispersion so as not to fall below a lower limit value of conditional expression (17), it is possible to suppress the anomalous dispersibility of the negative lens relatively, thereby enabling to contribute to correction of the chromatic aberration.

By letting the positive lens have dispersion so as not to exceed an upper limit value of conditional expression (17), it is possible to reduce the anomalous dispersibility of the positive lens, thereby enabling to contribute to the correction of the chromatic aberration.

In the zoom lens of the present embodiment, it is preferable that the following conditional expression (18) is satisfied:

$$0.6 < fb_w/IH_{MAX} < 1.8 \qquad (18)$$

where, $fb_w$ denotes an air-converted back focus of the zoom lens at the time of focusing on the axial infinite object point at the wide angle end, and $IH_{MAX}$ denotes the maximum image height of the zoom lens, and is the maximum value when it changes.

By making so as not to fall below a lower limit value of conditional expression (18), the overall zoom lens is separated away from an image plane, thereby making it easy to move an exit pupil away from the image plane, and also making it easy to suppress a fluctuation in an angle of incidence of a light rayon to the image plane. Accordingly, it becomes easy to guide a sufficient amount of light to an overall screen.

By making so as not to exceed an upper limit value of conditional expression (18), it is possible to contribute to widening an angle of view at the wide angle end and shortening the overall length of the zoom lens at the time of use.

In the zoom lens of the present embodiment, it is preferable that the following conditional expression (19) is satisfied:

$$-2.0 < SF_{UN1P1} < 0.5 \qquad (19)$$

where, $$SF_{UN1P1} = (R_{UN1P1O} + R_{UN1P1I})/(R_{UN1P1O} - R_{UN1P1I})$$

where, $R_{UN1P1O}$ denotes a paraxial radius of curvature of an object-side surface of the object-side sub-lens unit in the first positive lens unit, and $R_{UN1P1I}$ denotes a paraxial radius of curvature of an image-side surface of the object-side sub-lens unit in the first positive lens unit.

By making so as not to fall below a lower limit value of conditional expression (19), it is possible to suppress the spherical aberration and the coma susceptible to occur at a surface of incidence of the object-side sub-lens unit in the first positive lens unit, thereby enabling to contribute to securing performance near the telephoto end in particular.

By making so as not to exceed an upper limit value of conditional expression (19), a principal point of the first positive lens unit is not let to be too close to the image, thereby making it is easy to secure the zooming ratio.

A zoom lens according to a certain embodiment is a four-unit zoom lens in which, the total number of lens units is four namely, the first negative lens unit, the first positive lens unit, the second negative lens unit, and the second positive lens unit.

Accordingly, it is easy to make an arrangement simple, thereby leading to small-sizing.

A zoom lens according to a certain embodiment includes a third positive lens unit having a positive refractive power on the object side of the first negative lens unit, and at the time of zooming from the wide angle end to the telephoto end, a distance between the third positive lens unit and the first negative lens unit changes, and the zoom lens is a five-unit zoom lens in which, the total number of lens units is five namely, the third positive lens unit, the first negative lens unit, the first positive lens unit, the second negative lens unit, and the second positive lens unit.

By changing the distance between the third positive lens unit and the first negative lens unit, the zooming ratio is made even higher. Moreover, it becomes easy to make an entrance pupil diameter at the telephoto end large.

In the zoom lens of the embodiment, it is preferable that the first negative lens unit includes a plastic aspheric lens that satisfies the following conditional expression (20):

$$0.0001 < |ASP_O - ASP_I|/IH_{33w} < 0.02 \qquad (20)$$

where, $IH_{33w}$ denotes the distance from the optical axis up to the position at which, the paraxial image plane intersects with the principal light ray when the light-incidence side half angle of view of the zoom lens at the time of focusing on the axial infinite object point at the wide angle end becomes 33°, $ASP_O$ denotes an amount of aspherical deviation at a position at which, a distance of an object-side surface of the plastic aspheric lens from then optical axis becomes $IH_{33w}$, and $ASP_I$ denotes an amount of aspherical deviation at a position at which, a distance of an image-side surface of the plastic aspheric lens from the optical axis becomes $IH_{33w}$, the amount of aspherical deviation is a distance along an optical axial direction from a reference spherical surface up to a target surface, and is let to have a positive sign when the target surface is on the image side with respect to the reference spherical surface, and here, a vertex of the reference spherical surface is let to be a vertex of the target surface, and a radius of curvature of the reference spherical surface is let to be same as a paraxial radius of curvature of the target surface.

Accordingly, the first negative lens unit contributes to correction of the curvature of field near the wide angle end in particular. By using the aspherical surface lens in the first negative lens unit, an effect of correction of the curvature of field is improved further. Moreover, the first negative lens unit has a larger size in a radial direction as compared to a size of in a radial direction of other lens units on the image side. By using the plastic aspherical lens in the first negative lens unit, a lens cost is also suppressed along with achieving an aspherical surface effect. However, a change in a surface shape due to a temperature for a plastic lens is larger than a change in a surface shape due to a temperature for glass, the curvature of field occurs for the plastic lens due to temperature change.

While achieving an aspheric surface effect by making so as not to fall below a lower limit value of conditional expression (20), a change in aberration due to the temperature change is suppressed by making so as not to exceed an upper limit value of conditional expression (20).

By a coefficient of thermal expansion a for a plastic material to be used satisfying the following conditional expression (A), it becomes easy to facilitate both of an ease of molding and suppressing an amount of change in temperature.

$$2e^{-5}(\mu m/^\circ C.) < \alpha < 8e^{-5}(\mu m/^\circ C.) \quad (A)$$

where, the coefficient of thermal expansion a is used to indicate that there is a dimension change of $\alpha$ μm when the temperature per 1 m has increased by 1° C.

In the zoom lens of the present embodiment, it is preferable that the object-side sub-lens unit in the first positive lens unit includes a single lens having a positive refractive power, and the image-side sub-lens unit in the first positive lens unit includes a cemented lens of a negative lens and a positive lens in order from the object side.

Accordingly, with lesser number of lenses, the refractive power of the first positive lens unit is secured, and an aberration correction function is secured. Moreover, it is possible to dispose the aperture stop near a center of the first positive lens unit, thereby enabling to secure symmetry of the zoom lens with respect to the aperture stop. Accordingly, it becomes easy to carry out small-sizing and to secure an optical performance.

In the zoom lens of the present embodiment, it is preferable that at the wide angle end, a light ray with a half angle of view not less than 33° can pass through the zoom lens, and the following conditional expression (21) is satisfied:

$$2.6 \le f_t/f_w < 13.0 \quad (21)$$

where, $f_t$ denotes a focal length of the overall zoom lens system at the time of focusing on the axial infinite object point at the telephoto end, and $f_w$ denotes the focal length of the overall zoom lens system at the time of focusing on the axial infinite object point at the wide angle end.

By securing the zooming ratio so as not to fall below a lower limit value of conditional expression (21), it is possible to select an angle of view that is appropriate for various photographic scenes.

By making so as not to exceed an upper limit value of conditional expression (21), it is possible to contribute to both of small-sizing of the overall length and securing the optical performance.

An image pickup apparatus according to an embodiment includes any one of the abovementioned zoom lenses, and an image pickup element which has an image pickup surface, and which converts an image formed on the image pickup surface by the zoom lens to an electric signal.

In a case in which, the zoom lens has a focusing function, each of the abovementioned arrangement is let to be an arrangement when focused on infinity.

The basic arrangement, and preferable arrangements and conditional expressions have heretofore been described. However, by combining appropriately a preferable arrangement and a preferable conditional expression with the basic arrangement, it is possible to arrange the zoom lens of the present embodiment more specifically. More specific zoom lenses of the present embodiment are as follow. Since a technical significance of each arrangement and each conditional expression has already been explained, repetitive description thereof will be omitted.

It is preferable to satisfy simultaneously the plurality of aforementioned arrangements mutually. Moreover, some of the arrangements may be satisfied simultaneously. For example, an arrangement may be made to use one of the aforementioned zoom lenses in the aforementioned zoom lens or the image pickup apparatus. Furthermore, it is preferable to make an arrangement in which, each conditional expression is satisfied separately, as it makes it easy to achieve the respective effect.

For each conditional expression, it is preferable to change the upper limit value and the lower limit value as shown below, as it enables to make the effect even more assured.

For conditional expression (1), it is more preferable to let the lower limit value to be 1.4, and 1.7 is even more preferable.

Moreover, for conditional expression (1), it is more preferable to let the upper limit value to be 2.5, and 2.3 is even more preferable.

For conditional expression (2), it is more preferable to let the lower limit value to be 0.5, and 0.55 is even more preferable.

Moreover, for conditional expression (2), it is more preferable to let the upper limit value to be 1.0, and 0.92 is even more preferable.

For conditional expression (3), it is more preferable to let the lower limit value to be −0.7, and −0.65 is even more preferable.

Moreover, for conditional expression (3), it is more preferable to let the upper limit value to be 1.3, and 1.1 is even more preferable.

For conditional expression (4), it is more preferable to let the lower limit value to be 1.1 or 1.2, and 1.3 is even more preferable.

Moreover, for conditional expression (4), it is more preferable to let the upper limit value to be 1.75, and 1.7 is even more preferable.

For conditional expression (4'), it is more preferable to let the lower limit value to be 1.2, and 1.3 is even more preferable.

Moreover, for conditional expression (4'), it is more preferable to let the upper limit value to be 1.75, and 1.7 is even more preferable.

For conditional expression (4"), it is more preferable to let the lower limit value to be 1.3.

Moreover, for conditional expression (4"), it is more preferable to let the upper limit value to be 1.75, and 1.7 is even more preferable.

For conditional expression (5), it is more preferable to let the lower limit value to be 0.6, and 0.7 is even more preferable.

Moreover, for conditional expression (5), it is more preferable to let the upper limit value to be 1.3, and 1.1 is even more preferable.

For conditional expression (6), it is more preferable to let the lower limit value to be 0.7, and 0.9 is even more preferable.

Moreover, for conditional expression (6), it is more preferable to let the upper limit value to be 1.7, and 1.6 is even more preferable.

For conditional expression (7), it is more preferable to let the lower limit value to be 0.5, and 0.55 is even more preferable.

Moreover, for conditional expression (7), it is more preferable to let the upper limit value to be 0.9, and 0.83 is even more preferable.

For conditional expression (8), it is more preferable to let the lower limit value to be 1.0, and 1.2 is even more preferable.

Moreover, for conditional expression (8), it is more preferable to let the upper limit value to be 2.3, and 2.0 is even more preferable.

For conditional expression (9), it is more preferable to let the lower limit value to be 1.4, and 1.6 is even more preferable.

Moreover, for conditional expression (9), it is more preferable to let the upper limit value to be 3.1, and 2.9 is even more preferable.

For conditional expression (10), it is more preferable to let the lower limit value to be 0.85, and 0.95 is even more preferable.

Moreover, for conditional expression (10), it is more preferable to let the upper limit value to be 1.8, and 1.7 is even more preferable.

For conditional expression (11), it is more preferable to let the lower limit value to be 1.2, and 1.5 is even more preferable.

Moreover, for conditional expression (11), it is more preferable to let the upper limit value to be 2.7, and 2.3 is even more preferable.

For conditional expression (12), it is more preferable to let the lower limit value to be 1.8, and 2.0 is even more preferable.

Moreover, for conditional expression (12), it is more preferable to let the upper limit value to be 3.6, and 3.1 is even more preferable.

For conditional expression (13), it is more preferable to let the lower limit value to be 1.1, and 1.2 is even more preferable.

Moreover, for conditional expression (13), it is more preferable to let the upper limit value to be 2.2, and 1.9 is even more preferable.

For conditional expression (14), it is more preferable to let the lower limit value to be 0.4, and 0.45 is even more preferable.

Moreover, for conditional expression (14), it is more preferable to let the upper limit value to be 1.1, and 1.0 is even more preferable.

For conditional expression (15), it is more preferable to let the lower limit value to be −16.0%, and −14.0% is even more preferable.

Moreover, for conditional expression (15), it is more preferable to let the upper limit value to be −8.0%, and −10.0% is even more preferable.

For conditional expression (16), it is more preferable to let the lower limit value to be 0.75, and 0.8 is even more preferable.

Moreover, for conditional expression (16), it is more preferable to let the upper limit value to be 1.4, and 1.3 is even more preferable.

For conditional expression (17), it is more preferable to let the lower limit value to be 65, and 67 is even more preferable.

Moreover, for conditional expression (17), it is more preferable to let the upper limit value to be 85, and 82 is even more preferable.

For conditional expression (18), it is more preferable to let the lower limit value to be 0.9, and 1.2 is even more preferable.

Moreover, for conditional expression (18), it is more preferable to let the upper limit value to be 1.6, and 1.4 is even more preferable.

For conditional expression (19), it is more preferable to let the lower limit value to be −1.7, and −1.5 is even more preferable.

Moreover, for conditional expression (19), it is more preferable to let the upper limit value to be 0.0, and −0.5 is even more preferable.

For conditional expression (20), it is more preferable to let the lower limit value to be 0.001.

Moreover, for conditional expression (20), it is more preferable to let the upper limit value to be 0.01.

For conditional expression (21), it is more preferable to let the lower limit value to be 2.7, and 2.8 is even more preferable.

Moreover, for conditional expression (21), it is more preferable to let the upper limit value to be 9.0, and 7.0 is even more preferable.

Figure 13:
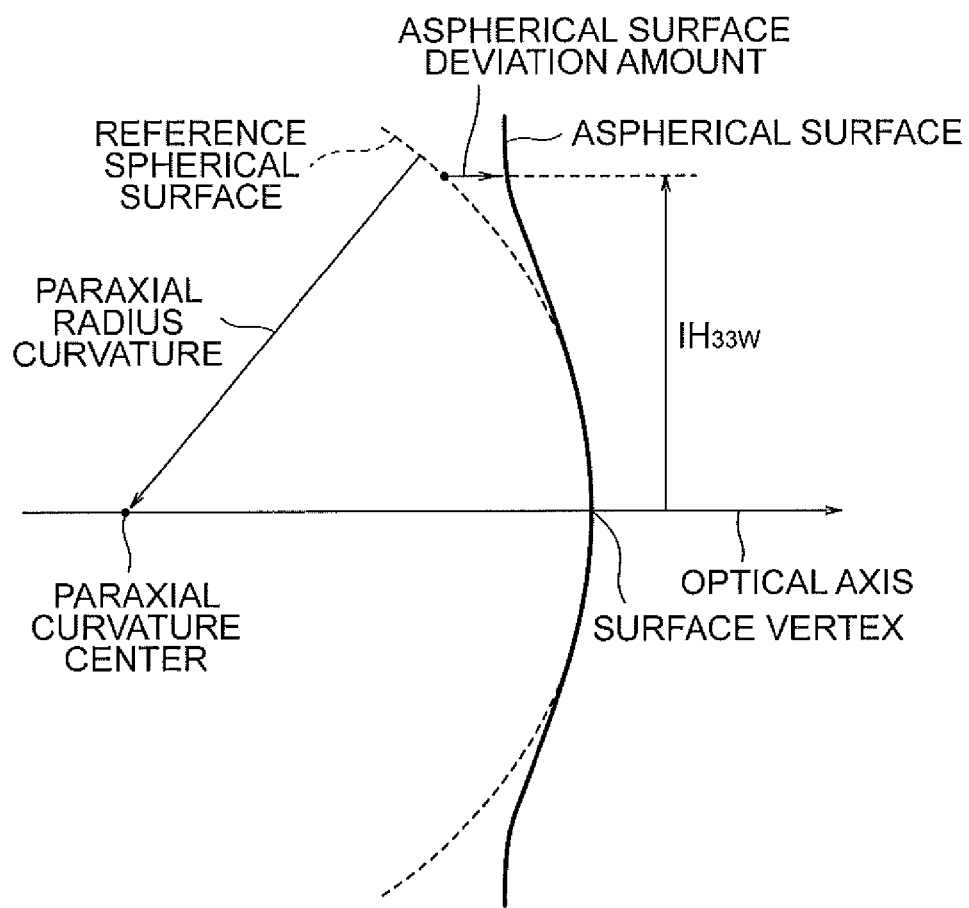
FIG. 13 is a cross-sectional view showing an amount of aspherical deviation of an aspheric lens.

The amount of aspherical deviation, as shown in FIG. 13, is a distance from a reference spherical surface up to an aspheric surface, measured in a direction parallel to the optical axis, when a spherical surface having a vertex same as a vertex of an aspheric surface, and for which, a radius of curvature is let to be same as the paraxial radius of curvature of the aspheric surface, and a direction toward the image (rightward direction in the diagram) is let to have a positive sign.

Figure 14:
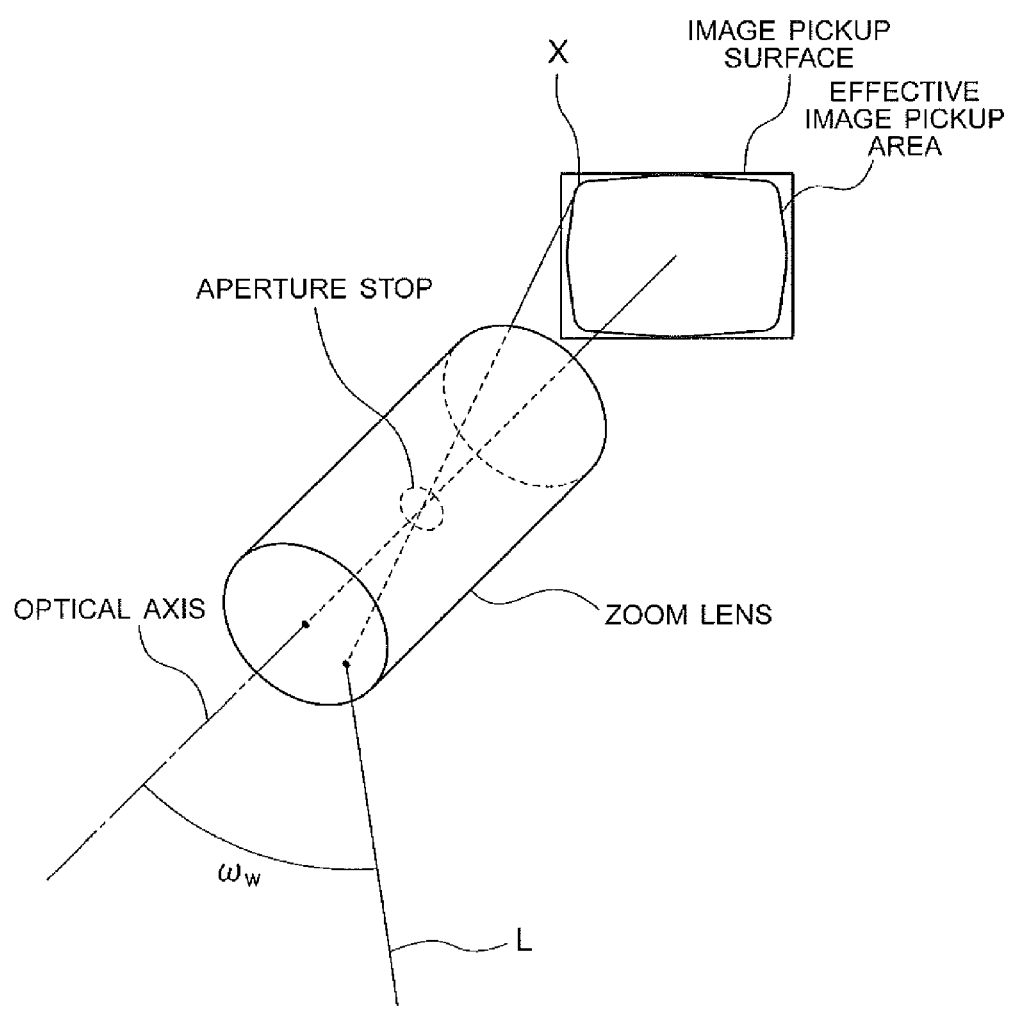
FIG. 14 is a diagram for explaining $\omega_w$.

$\omega_w$ (half angle of view when focused to an object at infinity at the wide angle end) will be described by using FIG. 14. In FIG. 14, as to how, a zoom lens, an aperture stop, and an image pickup surface are arranged on an optical axis is shown. A light ray which is incident on the zoom lens, upon passing through the aperture stop, is emerged from the zoom lens, and reaches the image pickup surface.

In FIG. 14, a light ray L shown by a solid line indicates alight ray which reaches a point X on an effective image pickup area, from among light rays which pass through the center of the aperture stop. The point X is a position farthest from the optical axis in the effective image pickup area. Here, the effective image pickup area being an area, in which an object image is formed, the point X becomes the maximum image-height position. In such manner, the light ray L is a light ray which passes through the aperture stop, and which is incident on the maximum image-height position. Moreover, $\omega_w$ is a half angle of view with respect to an optical axis of light ray L, at the wide angle end.

EXAMPLES

Examples from an example 1 to an example 6 of the zoom lens according to the present invention will be described below. Lens cross-sectional views of zoom lenses of the examples from the example 1 to the example 6 are lens cross-sectional views at the time of focusing on the infinite object point. Lens cross-sectional views of zoom lenses of the examples from the example 1 at a wide angle end are shown in FIG. 1A, FIG. 2A, FIG. 3A, FIG. 4A, FIG. 5A, and FIG. 6A. Lens cross-sectional views of zoom lenses of the examples from the example 1 to the example 6 at an intermediate focal length state are shown in FIG. 1B, FIG. 2B, FIG. 3B, FIG. 4B, FIG. 5B, and FIG. 6B. Lens cross-sectional views of zoom lenses of the examples from the example 1 to the example 6 at the telephoto end are shown in FIG. 1C, FIG. 2C, FIG. 3C, FIG. 4C, FIG. 5C, and FIG. 6C. In each lens cross-sectional view, a first lens unit is denoted by G1, a second lens unit is denoted by G2, a third lens unit is denoted by G3, a fourth lens unit is denoted by G4, a fifth lens unit is denoted by G5, an aperture stop is denoted by S, and an image plane in denoted by I. Moreover, although it is not shown in the diagrams, a parallel and flat plate that forms a low-pass filter, and a cover glass of an electronic image pickup element may be disposed between the image plane I and the rearmost lens unit on an image plane side. A wavelength region restricting coating which restricts infrared light may be applied to a surface of the flat and parallel plate. Moreover, a multilayer film for restricting wavelength region may be applied to a surface of the cover glass. The cover glass C may be imparted an effect of a low-pass filter.

In the examples form the example 1 to the example 6, an image height is same at the wide angle end, in the intermediate focal length state, and at the telephoto end. However, the image height at the wide angle end may be let to be small. This is because, letting the image at the wide angle end to be barrel-shaped, it is possible to correct distortion by converting the barrel-shaped image to a rectangular image electrically. Details of correcting the distortion electrically are omitted.

Figure 1B:
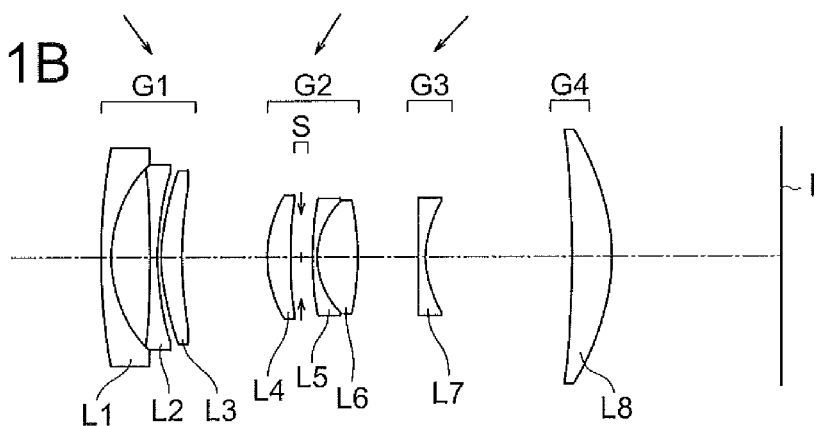
Figure 1C:
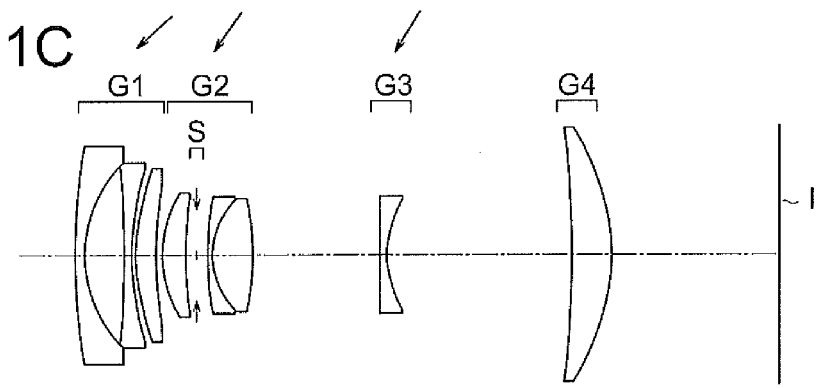

The zoom lens of the example 1, as shown in FIG. 1A, FIG. 1B, and FIG. 1C, includes in order from an object side, a first lens unit G1 (first negative lens unit) having a negative refractive power, a second lens unit G2 (first positive lens unit) having a positive refractive power, a third lens unit G3 (second negative lens unit) having a negative refractive power, and a fourth lens unit G4 (second positive lens unit) having a positive refractive power. An aperture stop is disposed in the second lens unit G2.

Here, virtual object plane (a ninth surface and a $14^{th}$ surface) are not shown in the diagram.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

In order from the object side, the first lens unit G1 includes a negative meniscus lens L1 having a convex surface directed toward the object side, a biconcave negative lens L2, and a positive meniscus lens L3 having a concave surface directed toward the image side. The second lens unit G2 includes a positive meniscus lens L4 (object-side sub-lens unit) having a convex surface directed toward the object side, and a cemented lens (image-side sub-lens unit) of a negative meniscus lens L5 having a convex surface directed toward the object side and a biconvex positive lens L6. The third lens unit G3 includes a biconcave negative lens L7. The fourth lens unit G4 includes a positive meniscus lens L8 having a convex surface directed toward the image side.

An aspheric surface is provided to nine surfaces namely, both surfaces of the positive meniscus lens L3, both surfaces of the positive meniscus lens L4, an image-side surface of the biconvex positive lens L6, both surfaces of the biconcave negative lens L7, and both surfaces of the positive meniscus lens L8.

Figure 2A:
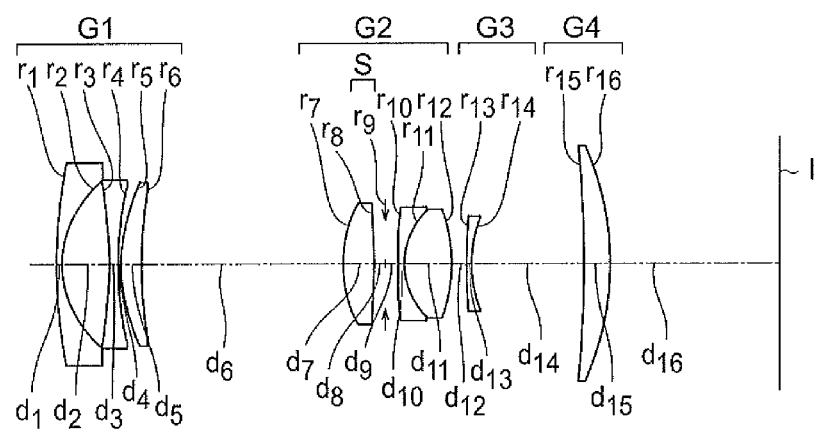
FIG. 2A, FIG. 2B, and FIG. 2C are lens cross-sectional views at the time of focusing on an infinite object point of a zoom lens of an example 2, where.
Figure 2B:
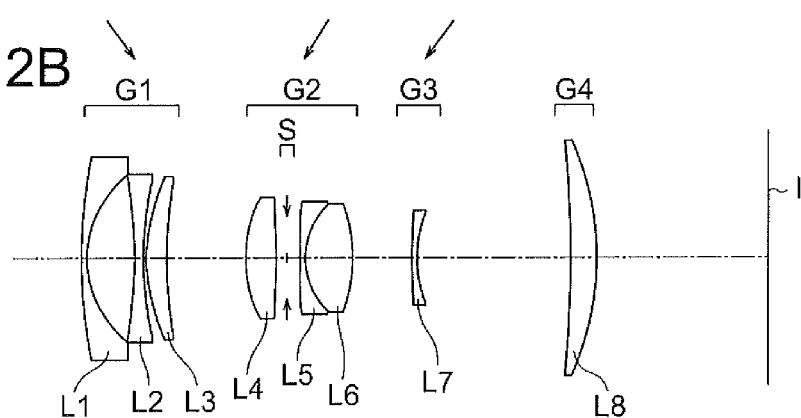
Figure 2C:
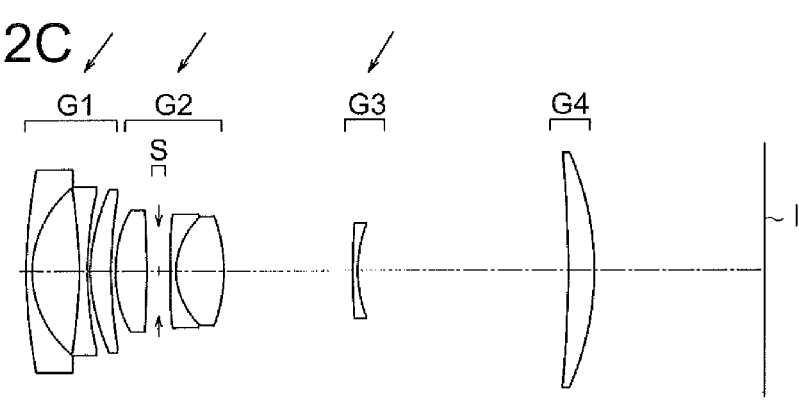

The zoom lens of the example 2, as shown in FIG. 2A, FIG. 2B, and FIG. 2C, includes in order from an object side, a first lens unit G1 (first negative lens unit) having a negative refractive power, a second lens unit G2 (first positive lens unit) having a positive refractive power, a third lens unit G3 (second negative lens unit) having a negative refractive power, and a fourth lens unit G4 (second positive lens unit) having a positive refractive power). An aperture stop S is disposed in the second lens unit G2.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

In order from the object side, the first lens unit G1 includes a negative meniscus lens L1 having a convex surface directed toward the object side, a biconcave negative lens L2, and a positive meniscus lens L3 having a concave surface directed toward the image side. The second lens unit G2 includes a biconvex positive lens L4 (object-side sub-lens unit), and a cemented lens (image-side sub-lens unit) of a negative meniscus lens L5 having a convex surface directed toward the object side and a biconvex positive lens L6. The third lens unit G3 includes a negative meniscus lens L7 having a convex surface directed toward the object side. The fourth lens unit G4 includes a positive meniscus lens L8 having a convex surface directed toward the image side.

An aspheric surface is provided to six surfaces namely, both surfaces of the biconcave negative lens L2, both surfaces of the biconvex positive lens L4, and both surfaces of the negative meniscus lens L7.

Figure 3A:
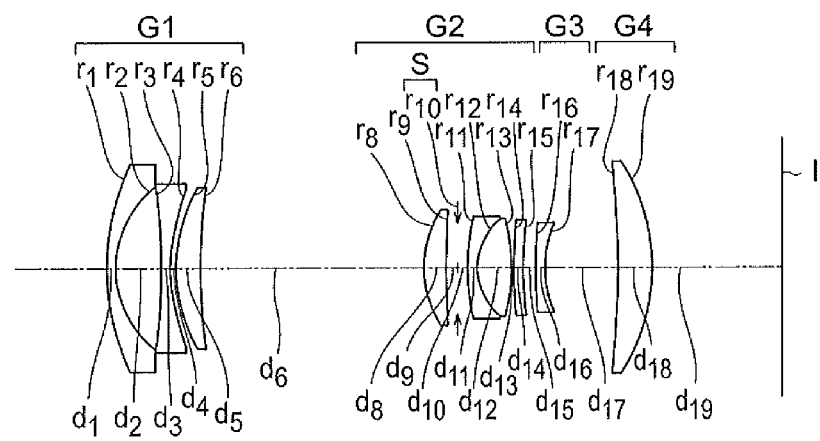
FIG. 3A, FIG. 3B, and FIG. 3C are lens cross-sectional views at the time of focusing on an infinite object point of a zoom lens of an example 3, where.
Figure 3B:
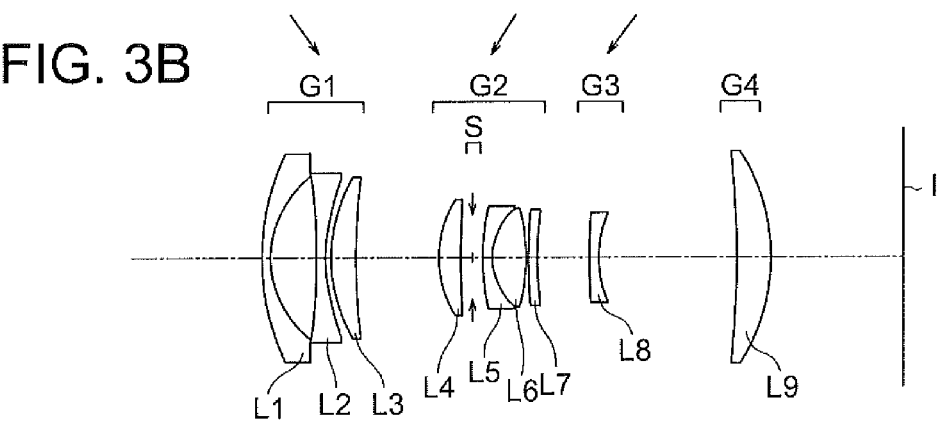
Figure 3C:
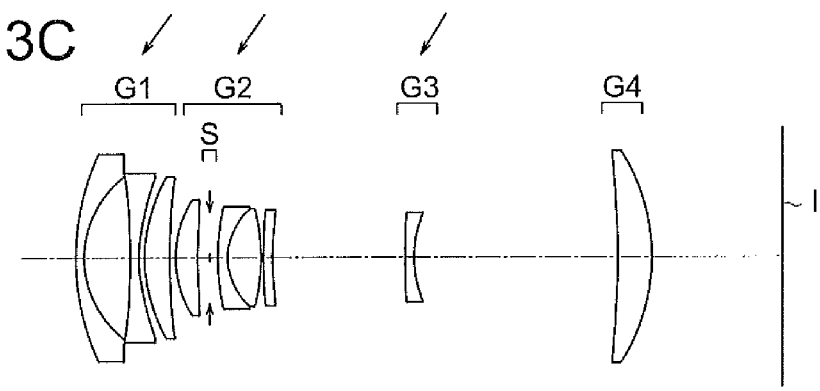

The zoom lens of the example 3, as shown in FIG. 3A, FIG. 3B, and FIG. 3C, includes in order from an object side, a first lens unit G1 (first negative lens unit) having a negative refractive power, a second lens unit G2 (first positive lens unit) having a positive refractive power, a third lens unit G3 (second negative lens unit) having a negative refractive power, and a fourth lens unit G4 (second positive lens unit) having a positive refractive power. An aperture stop S is disposed in the second lens unit G2.

Here, a virtual object plane (seventh surface) is not shown in the diagram.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

In order from the object side, the first lens unit G1 includes a negative meniscus lens L1 having a convex surface directed toward the object side, a negative meniscus lens L2 having a convex surface directed toward the object side, and a positive meniscus lens L3 having a concave surface directed toward the image side. The second lens unit G2 includes a positive meniscus lens L4 (object-side sub-lens unit) having a convex surface directed toward the object side, a cemented lens of a negative meniscus lens L5 having a convex surface directed toward the object side and a biconvex positive lens L6, and a negative meniscus lens L7 having a convex surface directed toward the object side. The third lens unit G3 includes a negative meniscus lens L8 having a convex surface directed toward the object side. The fourth lens unit G4 includes a positive meniscus lens L9 having a convex surface directed toward the image side. Here, the negative meniscus lens L5, the biconvex positive lens L6, and the negative meniscus lens L7 are included the image-side sub-lens unit.

An aspheric surface is provided to eight surfaces namely, both surfaces of the negative meniscus lens L2, both surfaces of the positive meniscus lens L4, both surfaces of the negative meniscus lens L8, and both surfaces of the positive meniscus lens L9.

Figure 4A:
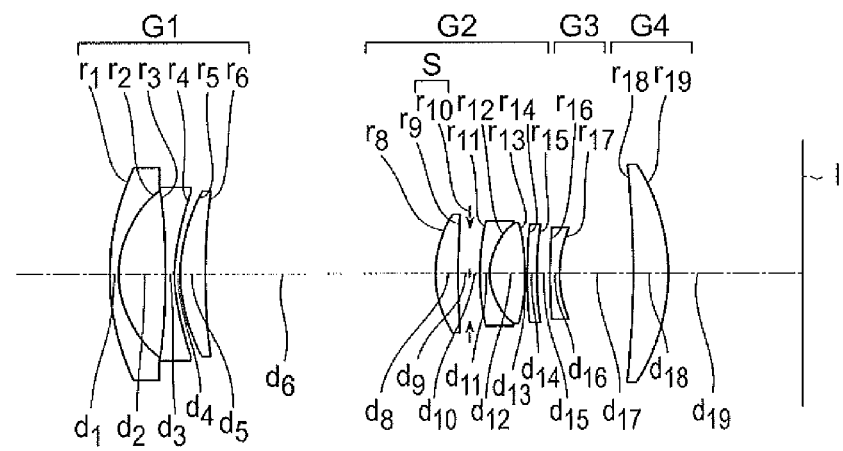
FIG. 4A, FIG. 4B, and FIG. 4C are lens cross-sectional views at the time of focusing on an infinite object point of a zoom lens of an example 4, where.
Figure 4B:
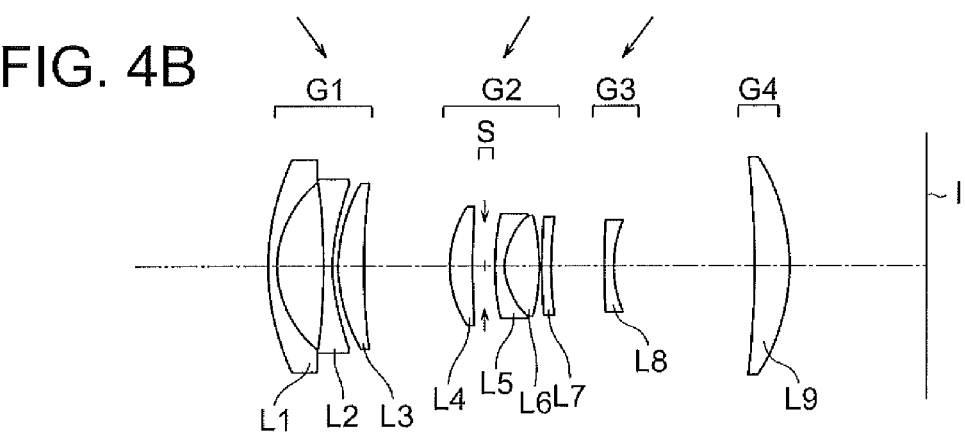
Figure 4C:
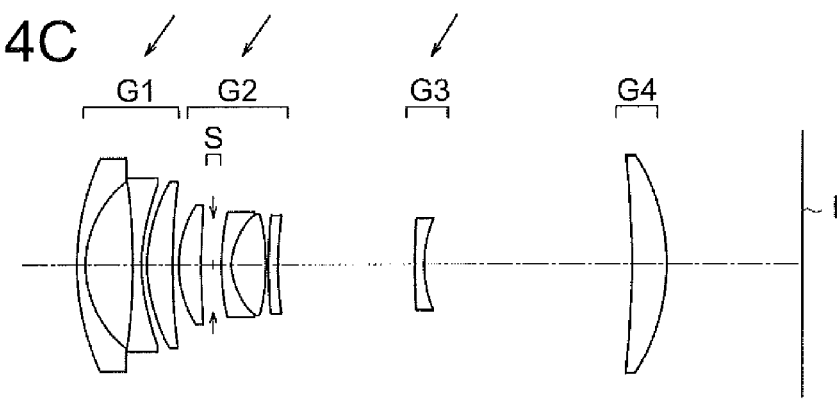

The zoom lens of the example 4, as shown in FIG. 4A, FIG. 4B, and FIG. 4C, includes in order from an object side, a first lens unit G1 (first negative lens unit) having a negative refractive power, a second lens unit G2 (first positive lens unit) having a positive refractive power, a third lens unit G3 (second negative lens unit) having a negative refractive power, and a fourth lens unit G4 (second positive lens unit) having a positive refractive power. An aperture stop S is disposed in the second lens unit G2.

Here, a virtual object plane (seventh surface) is not shown in the diagram.

At the time of zooming from a wide angle end to a telephoto end, the first lens unit G1, after moving toward an image side, moves toward the object side. The second lens unit G2 moves toward the object side. The third lens unit G3 moves toward the object side. The fourth lens unit G4 is fixed (is stationary). The aperture stop S moves toward the object side together with the second lens unit G2.

In order from the object side, the first lens unit G1 includes a negative meniscus lens L1 having a convex surface directed toward the object side, a negative meniscus lens L2 having a convex surface directed toward the object side, and a positive meniscus lens L3 having a concave surface directed toward the image side. The second lens unit G2 includes a cemented lens (object-side sub-lens unit) of a positive meniscus lens L4 having a convex surface directed toward the object side and a negative meniscus lens L5 having a convex surface directed toward the object side, a cemented lens of a negative meniscus lens L6 having a convex surface directed toward the object side and a biconvex positive lens L7, and a negative meniscus lens L8 having a convex surface directed toward the object side. The third lens unit G3 includes a negative meniscus lens L9 having a convex surface directed toward the object side. The fourth lens unit G4 includes a positive meniscus lens L10 having a convex surface directed toward the image side. Here, the negative meniscus lens L6, the biconvex positive lens L7, and the negative meniscus lens L8 are included in the image-side sub-lens unit.

An aspheric surface is provided to eight surfaces namely, both surfaces of the negative meniscus lens L2, a surface on the object side of the positive meniscus lens L4, a surface on the image side of the negative meniscus lens L5, both surfaces of the negative meniscus lens L9, a both surfaces of the positive meniscus lens L10.

Figure 5A:
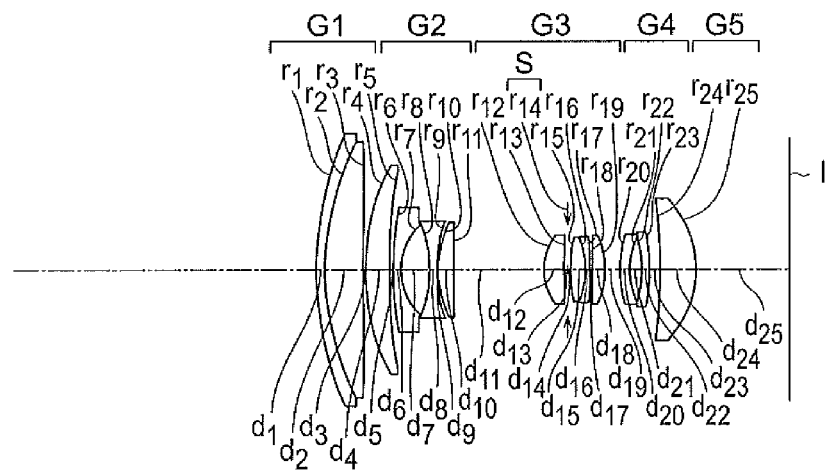
FIG. 5A, FIG. 5B, and FIG. 5C are lens cross-sectional views at the time of focusing on an infinite object point of a zoom lens of an example 5, where.
Figure 5B:
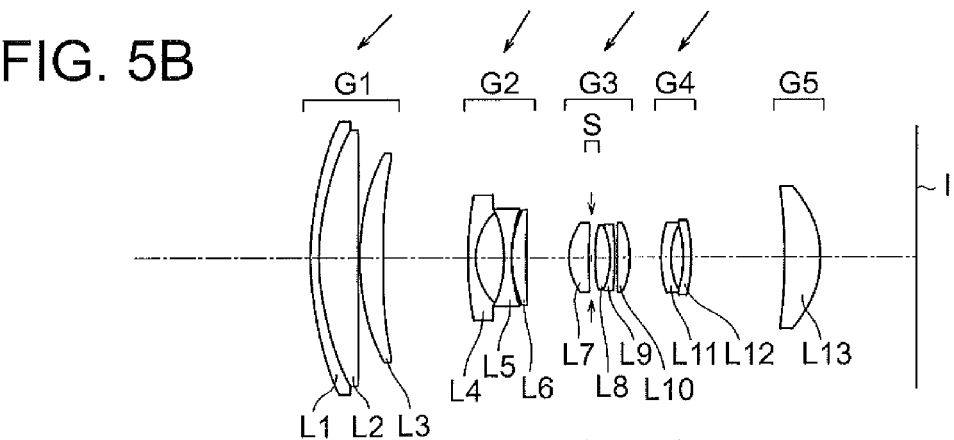
Figure 5C:
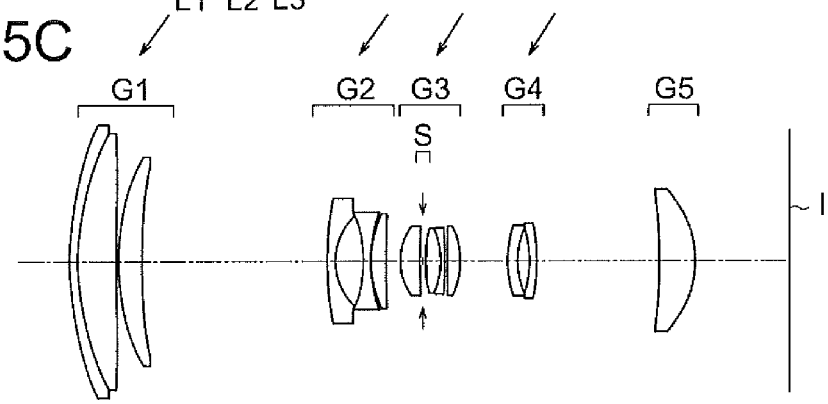

The zoom lens of the example 5, as shown in FIG. 5A, FIG. 5B, and FIG. 5C, includes in order from an object side, a first lens unit G1 having a positive refractive power, a second lens unit G2 (first negative lens unit) having a negative refractive power, a third lens unit G3 (first positive lens unit) having a positive refractive power, (a fourth lens unit G4) second negative lens unit) having a negative refractive power, and a fifth lens unit G5 (second positive lens unit) having a positive refractive power. An aperture stop S is disposed in the third lens unit G3.

At the time of zooming from a wide angle end to a telephoto end, the first lens unit G1 moves toward the object side. The second lens unit G2 moves toward the object side. The third lens unit G3 moves toward the object side. The fourth lens unit G4 moves toward the object side. The fifth lens unit G5 is fixed (is stationary). The aperture stop S moves toward the object side together with the third lens unit G3.

In order from the object side, the first lens unit G1 includes a cemented lens of a negative meniscus lens L1 having a convex surface directed toward the object side and a biconvex positive lens L2, and a positive meniscus lens L3 having a convex surface directed toward the object side. The second lens unit G2 includes a negative meniscus lens L4 having a convex surface directed toward the object side, a biconcave negative lens L5, and a positive meniscus lens L6 having a concave surface directed toward an image side. The third lens unit G3 includes a positive meniscus lens L7 (object-side sub-lens unit) having a convex surface directed toward the object side, a cemented lens of a biconvex positive lens L8 and a negative meniscus lens L9 having a convex surface directed toward the image side, and a biconvex positive lens L10. The fourth lens unit G4 includes a negative meniscus lens L11 having a convex surface directed toward the object side and a negative meniscus lens L12 having a convex surface directed toward the image side. The fifth lens unit G5 includes a negative meniscus lens L13 having a convex surface directed toward the image side. Here, the biconvex positive lens L8, the negative meniscus lens L9, and the biconvex positive lens L10 are included in the image-side sub-lens unit.

An aspheric surface is provided to 10 surfaces namely, both surfaces of the biconvex positive lens L5, both surfaces of the positive meniscus lens L7, both surfaces of the biconvex positive lens L10, both surfaces of the negative meniscus lens L12, and both surfaces of the positive meniscus lens L13.

Figure 6A:
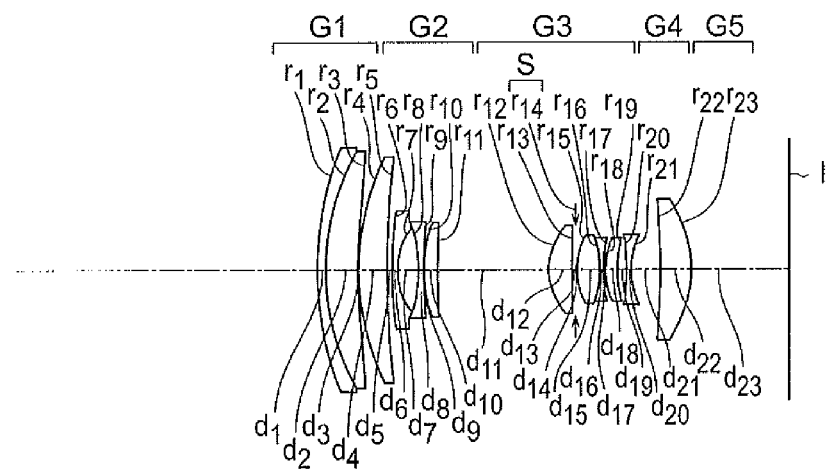
FIG. 6A, FIG. 6B, and FIG. 6C are lens cross-sectional views at the time of focusing on an infinite object point of a zoom lens of an example 6, where.
Figure 6B:
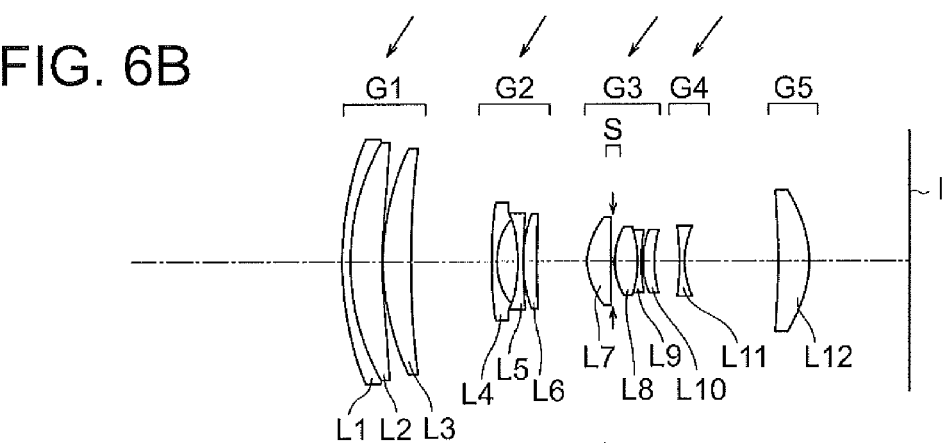
Figure 6C:
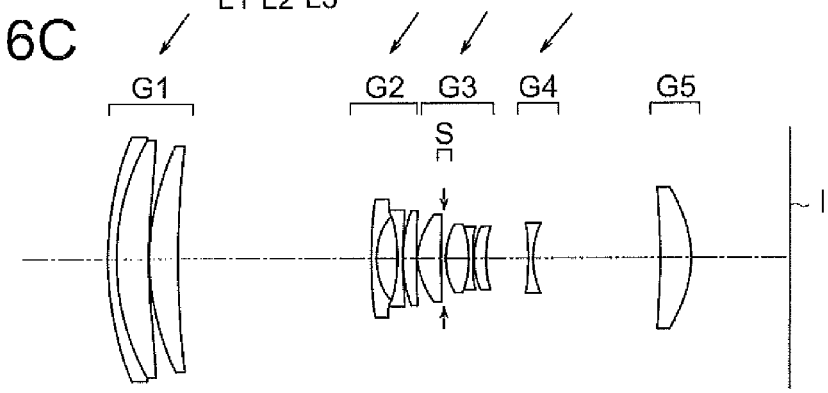

The zoom lens of the example 6, as shown in FIG. 6A, FIG. 6B, and FIG. 6C, includes in order from an object side, a first lens unit G1 having a positive refractive power, a second lens unit G2 (first negative lens unit) having a negative refractive power, a third lens unit G3 (first positive lens unit) having a positive refractive power, a fourth lens unit G4 (second negative lens unit) having a negative refractive power, and a fifth lens unit G5 (second positive lens unit) having a positive refractive power. An aperture stop S is disposed in the third lens unit G3.

At the time of zooming from a wide angle end to a telephoto end, the first lens unit G1 moves toward the object side. The second lens unit G2 moves toward the object side. The third lens unit G3 moves toward the object side. The fifth lens unit G5 is fixed (is stationary). The aperture stop S moves toward the object side together with the third lens unit G3.

In order from the object side, the first lens unit G1 includes a cemented lens of a negative meniscus lens L1 having a convex surface directed toward the object side and a positive meniscus lens L2 having a convex surface directed toward the object side, and a positive meniscus lens L3 having a convex surface directed toward the object side.

The second lens unit G2 includes a negative meniscus lens L4 having a convex surface directed toward the object side, a biconcave negative lens L5, and a positive meniscus lens L6 having a concave surface directed toward an image side. The third lens unit G3 includes a positive meniscus lens L7 (object-side sub-lens unit) having a convex surface directed toward the object side, a cemented lens of a biconvex positive lens L8 and a biconcave negative lens L9, and a positive meniscus lens L10 having a convex surface directed toward the object side. The fourth lens unit G4 includes a biconcave negative lens L11. The fifth lens unit G5 includes a positive meniscus lens L12 having a convex surface directed toward the image side. Here, the biconvex positive lens L8, the biconcave negative lens L9, and the positive meniscus lens L10 are included in the image-side sub-lens unit.

An aspheric surface is provided to 10 surfaces namely, both surfaces of the biconcave negative lens L5, both surfaces of the positive meniscus lens L7, both surfaces of the positive meniscus lens L10, both surfaces of the biconcave negative lens L11, and both surfaced of the positive meniscus lens L12.

Numerical data of each example described above is shown below. Apart from symbols described above, f denotes a focal length of the entire system (mm), FB denotes a back focus (mm), each of f1, f2 . . . is a focal length of each lens unit, IH denotes an image height, FNO. denotes an F number, ω denotes a half angle of view, r denotes radius of curvature of each lens surface, d denotes a distance between respective lens surfaces, nd denotes a refractive index of each lens for a d-line, and vd denotes an Abbe constant for each lens for a d-line. An entire length described hereinafter is a length which is obtained by adding a back focus to a distance from a lens forefront surface up to a lens backmost surface. FB (back focus) is a unit which is expressed upon air conversion of a distance from the lens backmost surface to a paraxial image surface.

Moreover, using the aspherical surface coefficients of each embodiment, a shape of the aspheric surface is described by the following expression:

where Z is let to be a coordinate of a direction along an optical axis, and Y is let to be a coordinate of a direction orthogonal to the optical axis.

$$Z=(Y^2/r)/[1+\{1-(1+K)\cdot(Y/r)^2\}^{1/2}]+A4\times Y^4+A6\times Y^6+A8\times Y^8+A10\times Y^{10} \quad (I)$$

where, r denotes a paraxial radius of curvature, K denotes a conical coefficient, A4, A6, A8, and A10 denote aspherical surface coefficients of a fourth order, a sixth order, an eight order, and a tenth order respectively. Moreover, in the aspherical surface coefficients, 'e–n' (where, n is an integral number) indicates '$10^{-n}$'.

Example 1

Unit mm

Surface data

| Surface no. | r | d | nd | vd |
|---|---|---|---|---|
| Object plane | ∞ | ∞ | | |
| 1 | 64.702 | 0.800 | 1.69680 | 55.53 |
| 2 | 11.606 | 3.422 | | |
| 3 | −88.327 | 0.700 | 1.49700 | 81.54 |
| 4 | 27.506 | 0.200 | | |
| 5* | 15.778 | 1.914 | 1.63493 | 23.90 |
| 6* | 31.865 | Variable | | |
| 7* | 10.795 | 2.116 | 1.80139 | 45.45 |
| 8* | 113.014 | 0.849 | | |
| 9 | ∞ | 0.000 | | |
| 10(Stop) | ∞ | 1.000 | | |
| 11 | 28.817 | 0.400 | 1.90366 | 31.32 |
| 12 | 7.100 | 3.500 | 1.59201 | 67.02 |
| 13* | −24.966 | 0.000 | | |
| 14 | ∞ | Variable | | |
| 15* | −171.145 | 0.600 | 1.53071 | 55.69 |
| 16* | 11.052 | Variable | | |
| 17* | −97.090 | 3.574 | 1.76802 | 49.24 |
| 18* | −20.177 | | | |
| Image plane (Image pickup surface) | ∞ | | | |

Aspherical surface data

5th surface k = 0.0000
A4 = −8.1884e−005, A6 = −2.7042e−007, A8 = 1.4238e−008,
A10 = −4.0588e−010

6th surface k = 0.0000
A4 = −9.9349e−005, A6 = 4.2182e−007, A8 = −6.1084e−009,
A10 = −2.2166e−010

7th surface k = 0.0000
A4 = 4.2062e−005, A6 = −5.7246e−007, A8 = 7.1083e−008,
A10 = −1.2063e−009

8th surface k = 0.0000
A4 = 1.6242e−004, A6 = −1.7979e−006, A8 = 1.0048e−007,
A10 = −2.0625e−009

13th surface k = 0.0000
A4 = 3.4943e−005, A6 = 2.8257e−006, A8 = −7.7626e−008,
A10 = 4.2720e−009

15th surface k = 0.0000
A4 = 5.1140e−004, A6 = −3.3672e−005, A8 = 1.0216e−006,
A10 = −1.3810e−008

16th surface k = 0.0000
A4 = 5.7630e−004, A6 = −3.2837e−005, A8 = 8.6468e−007,
A10 = −1.0733e−008

17th surface k = 0.0000
A4 = −3.8824e−005, A6 = 7.4513e−007, A8 = −2.1479e−009,
A10 = −1.0307e−011

18th surface k = 0.0000
A4 = −2.5322e−005, A6 = 2.0336e−007, A8 = 3.7625e−009,
A10 = −2.9594e−011

Zoom data

| | WE | ST | TE |
|---|---|---|---|
| f | 14.240 | 24.250 | 41.180 |
| Fno. | 3.598 | 4.422 | 5.731 |
| 2ω | 82.4 | 49.2 | 29.4 |
| IH | 11.15 | 11.15 | 11.15 |
| FB | 14.435 | 14.435 | 14.435 |
| Lens total length(mm) | 46.746 | 44.298 | 46.599 |
| d6 | 17.597 | 7.338 | 0.500 |

-continued

Unit mm

| | | | |
|---|---|---|---|
| d14 | 2.236 | 5.330 | 11.119 |
| d16 | 7.838 | 12.558 | 15.909 |

Unit focal length

| | | | |
|---|---|---|---|
| f1 = −18.8024 | f2 = 13.533 | f3 = −19.5402 | f4 = 32.5074 |

Example 2

Unit mm

Surface data

| Surface no. | r | d | nd | vd |
|---|---|---|---|---|
| Object plane | ∞ | ∞ | | |
| 1 | 44.846 | 0.500 | 1.77250 | 49.60 |
| 2 | 10.080 | 4.150 | | |
| 3* | −40.189 | 0.760 | 1.53071 | 55.69 |
| 4* | 38.530 | 0.190 | | |
| 5 | 17.821 | 1.700 | 2.00069 | 25.46 |
| 6 | 37.691 | Variable | | |
| 7* | 12.147 | 2.711 | 1.74156 | 49.21 |
| 8* | −62.740 | 1.000 | | |
| 9 (Stop) | ∞ | 1.120 | | |
| 10 | 136.852 | 0.520 | 1.74951 | 35.33 |
| 11 | 6.962 | 4.200 | 1.49700 | 81.54 |
| 12 | −15.588 | Variable | | |
| 13* | 47.328 | 0.400 | 1.53071 | 55.69 |
| 14* | 10.352 | Variable | | |
| 15 | −99.929 | 2.300 | 1.83481 | 42.73 |
| 16 | −26.850 | | | |
| Image plane (Image pickup surface) | ∞ | | | |

Aspherical surface data

3rd surface k = 0.0000
A4 = 6.6785e−005, A6 = −8.8705e−007, A8 = −9.6050e−010,
A10 = −8.1513e−013

4th surface k = 0.0000
A4 = 5.6775e−005, A6 = −1.1574e−006, A8 = −1.5695e−011

7th surface k = 0.0000
A4 = −2.4426e−005, A6 = −3.5991e−007, A8 = 1.4222e−008,
A10 = −7.5500e−010

8th surface k = 0.0000
A4 = 8.7510e−005, A6 = −3.4669e−007, A8 = 3.1047e−010,
A10 = −5.2955e−010

13th surface k = 0.0000
A4 = −4.2631e−004, A6 = 8.4142e−006, A8 = 8.5933e−008,
A10 = −1.9000e−009

14th surface k = 0.0000
A4 = −1.9000e−009, A6 = −4.7992e−004, A8 = 9.9258e−006

Zoom data

| | WE | ST | TE |
|---|---|---|---|
| f | 14.295 | 24.219 | 41.554 |
| Fno. | 3.638 | 4.691 | 5.794 |
| 2ω | 83.8 | 49.5 | 29.2 |
| IH | 11.15 | 11.15 | 11.15 |

-continued

Unit mm

| | | | |
|---|---|---|---|
| FB | 15.180 | 15.180 | 15.180 |
| Lens total length (mm) | 48.921 | 45.522 | 50.146 |
| d6 | 17.997 | 7.188 | 0.500 |
| d12 | 1.346 | 5.172 | 11.365 |
| d14 | 10.027 | 13.611 | 18.729 |

Unit focal length

| | | | |
|---|---|---|---|
| f1 = −18.1399 | f2 = 14.6528 | f3 = −25.0599 | f4 = 43.3593 |

Example 3

Unit mm

Surface data

| Surface no. | r | d | nd | vd |
|---|---|---|---|---|
| Object plane | ∞ | ∞ | | |
| 1 | 29.848 | 0.800 | 1.88300 | 40.80 |
| 2 | 11.140 | 5.015 | | |
| 3* | 1984.401 | 1.000 | 1.62263 | 58.16 |
| 4* | 16.340 | 0.700 | | |
| 5 | 21.277 | 2.585 | 1.84666 | 23.78 |
| 6 | 97.119 | Variable | | |
| 7 | ∞ | 0.000 | | |
| 8* | 13.066 | 2.415 | 1.82080 | 42.71 |
| 9* | 156.306 | 1.285 | | |
| 10 (Stop) | ∞ | 1.000 | | |
| 11 | 25.322 | 1.055 | 1.80000 | 29.84 |
| 12 | 7.246 | 3.754 | 1.49700 | 81.54 |
| 13 | −21.771 | 0.250 | | |
| 14 | 66.440 | 1.000 | 1.49700 | 81.54 |
| 15 | 48.900 | Variable | | |
| 16* | 505.239 | 1.000 | 1.61881 | 63.85 |
| 17* | 13.517 | Variable | | |
| 18* | −157.716 | 3.653 | 1.72903 | 54.04 |
| 19* | −23.343 | | | |
| Image plane (Image pickup surface) | ∞ | | | |

Aspherical surface data

3rd surface k = 0.0000
A4 = −3.9379e−004, A6 = 1.0647e−005, A8 = −1.6978e−007,
A10 = 1.4500e−009, A12 = −5.1500e−012

4th surface k = 0.0000
A4 = −4.5183e−004, A6 = 1.1467e−005, A8 = −1.9507e−007,
A10 = 1.7598e−009, A12 = −6.6344e−012

8th surface k = 0.0000
A4 = −4.2932e−006, A6 = 4.6954e−007, A8 = −3.4902e−009,
A10 = 3.0475e−011

9th surface k = 0.0000
A4 = 6.1702e−005, A6 = 6.0143e−007, A8 = −1.0191e−008,
A10 = 8.6614e−011

16th surface k = 0.0000
A4 = 1.4476e−004, A6 = −8.0102e−006, A8 = 3.2317e−007,
A10 = −4.3184e−009

17th surface k = 0.0000
A4 = 2.0586e−004, A6 = −7.8912e−006, A8 = 2.3579e−007,
A10 = −2.1593e−009

-continued

| Unit mm |
|---|

18th surface k = 0.0000
A4 = −6.2356e−005, A6 = 8.0243e−007, A8 = −2.9536e−009,
A10 = −2.1108e−012

19th surface k = 0.0000
A4 = −5.2173e−005, A6 = 5.3860e−007, A8 = −2.4108e−010,
A10 = −1.0254e−011

| Zoom data | | | |
|---|---|---|---|
| | WE | ST | TE |
| F | 12.240 | 24.441 | 48.804 |
| Fno. | 3.570 | 4.670 | 6.411 |
| 2ω | 91.4 | 48.4 | 25.0 |
| IH | 11.15 | 11.15 | 11.15 |
| FB | 14.203 | 14.203 | 14.203 |
| Lens total length (mm) | 58.907 | 55.152 | 62.208 |
| d6 | 24.200 | 9.114 | 0.400 |
| d15 | 1.346 | 5.556 | 14.391 |
| d17 | 7.849 | 14.969 | 21.905 |

| Unit focal length | | | |
|---|---|---|---|
| f1 = −17.9851 | f2 = 15.448 | f3 = −22.4611 | f4 = 37.156 |

Example 4

| Unit mm |
|---|
| Surface data |

| Surface no. | r | d | nd | vd |
|---|---|---|---|---|
| Object plane | ∞ | ∞ | | |
| 1 | 29.848 | 0.800 | 1.88300 | 40.80 |
| 2 | 11.140 | 5.015 | | |
| 3* | 1984.401 | 1.000 | 1.62263 | 58.16 |
| 4* | 16.340 | 0.700 | | |
| 5 | 21.277 | 2.585 | 1.84666 | 23.78 |
| 6 | 97.119 | Variable | | |
| 7 | ∞ | 0.000 | | |
| 8* | 13.066 | 2.415 | 1.82080 | 42.71 |
| 9 | 500.000 | 0.400 | 1.80518 | 25.42 |
| 10* | 156.306 | 1.285 | | |
| 11 (Stop) | ∞ | 1.000 | | |
| 12 | 25.322 | 1.055 | 1.80000 | 29.84 |
| 13 | 7.246 | 3.754 | 1.49700 | 81.54 |
| 14 | −21.771 | 0.250 | | |
| 15 | 66.440 | 1.000 | 1.49700 | 81.54 |
| 16 | 48.900 | Variable | | |
| 17* | 505.239 | 1.000 | 1.61881 | 63.85 |
| 18* | 13.517 | Variable | | |
| 19* | −157.716 | 3.653 | 1.72903 | 54.04 |
| 20* | −23.343 | | | |
| Image plane (Image pickup surface) | ∞ | | | |

| Aspherical surface data |
|---|

3rd surface k = 0.0000
A4 = −3.9379e−004, A6 = 1.0647e−005, A8 = −1.6978e−007,
A10 = 1.4500e−009, A12 = −5.1500e−012

4th surface k = 0.0000
A4 = −4.5183e−004, A6 = 1.1467e−005, A8 = −1.9507e−007,
A10 = 1.7598e−009, A12 = −6.6344e−012

-continued

| Unit mm |
|---|

8th surface k = 0.0000
A4 = −7.5000e−006, A6 = 4.4000e−007, A8 = −3.4902e−009,
A10 = 3.0475e−011

10th surface k = 0.0000
A4 = 6.1702e−005, A6 = 6.0143e−007, A8 = −1.0191e−008,
A10 = 8.6614e−011

17th surface k = 0.0000
A4 = 1.4476e−004, A6 = −8.0102e−006, A8 = 3.2317e−007,
A10 = −4.3184e−009

18th surface k = 0.0000
A4 = 2.0586e−004, A6 = −7.8912e−006, A8 = 2.3579e−007,
A10 = −2.1593e−009

19th surface k = 0.0000
A4 = −6.2356e−005, A6 = 8.0243e−007, A8 = −2.9536e−009,
A10 = −2.1108e−012

20th surface k = 0.0000
A4 = −5.2173e−005, A6 = 5.3860e−007, A8 = −2.4108e−010,
A10 = −1.0254e−011

| Zoom data | | | |
|---|---|---|---|
| | WE | ST | TE |
| f | 12.189 | 24.458 | 48.995 |
| Fno. | 3.518 | 4.633 | 6.392 |
| 2ω | 91.3 | 48.3 | 24.9 |
| IH | 11.15 | 11.15 | 11.15 |
| FB | 13.513 | 13.513 | 13.513 |
| Lens total length (mm) | 59.307 | 55.552 | 62.610 |
| d6 | 24.200 | 9.114 | 0.400 |
| d16 | 1.438 | 5.565 | 14.333 |
| d18 | 7.757 | 14.961 | 21.964 |

| Unit focal length | | | |
|---|---|---|---|
| f1 = −17.9851 | f2 = 15.4541 | f3 = −22.4611 | f4 = 37.156 |

Example 5

| Unit mm |
|---|
| Surface data |

| Surface no. | r | d | nd | vd |
|---|---|---|---|---|
| Object plane | ∞ | ∞ | | |
| 1 | 59.515 | 1.400 | 1.92286 | 20.88 |
| 2 | 46.296 | 6.500 | 1.49700 | 81.61 |
| 3 | −2251.192 | 0.100 | | |
| 4 | 38.143 | 4.034 | 1.49700 | 81.61 |
| 5 | 109.792 | Variable | | |
| 6 | 76.964 | 1.200 | 1.88300 | 40.76 |
| 7 | 11.000 | 4.782 | | |
| 8* | −16.239 | 1.100 | 1.72903 | 54.04 |
| 9* | 24.458 | 0.124 | | |
| 10 | 19.498 | 2.500 | 1.92286 | 18.90 |
| 11 | 202.369 | Variable | | |
| 12* | 10.124 | 3.155 | 1.49700 | 81.54 |
| 13* | 116.156 | 0.500 | | |
| 14 (Stop) | ∞ | 0.500 | | |
| 15 | 23.136 | 2.605 | 1.49700 | 81.61 |
| 16 | −13.808 | 0.800 | 1.83400 | 37.16 |

-continued

| Unit mm | | | | |
|---|---|---|---|---|
| 17 | −86.427 | 0.300 | | |
| 18* | 120.584 | 2.020 | 1.51633 | 64.14 |
| 19* | −15.324 | Variable | | |
| 20 | 21.397 | 1.500 | 1.80100 | 34.97 |
| 21 | 10.272 | 2.054 | | |
| 22* | −19.000 | 1.163 | 1.53071 | 55.69 |
| 23* | −37.268 | Variable | | |
| 24* | −87.836 | 5.838 | 1.49710 | 81.56 |
| 25* | −16.656 | | | |
| Image plane (Image pickup surface) | ∞ | | | |

Aspherical surface data

8th surface k = 0.0000
A4 = −5.8486e−005, A6 = 2.1361e−006, A8 = −6.7603e−009,
A10 = −8.3600e−011
9th surface k = 0.0000
A4 = −3.0734e−005, A6 = 2.0841e−006, A8 = −8.3797e−010,
A10 = −1.5434e−010
12th surface k = 0.0000
A4 = −8.8696e−005, A6 = −5.4474e−009, A8 = −1.5725e−008,
A10 = −5.3981e−010, A12 = −3.7672e−011
13th surface k = 0.0000
A4 = −6.5884e−005, A6 = 2.3683e−007, A8 = −7.4430e−008,
A10 = −9.1796e−010, A12 = −1.5468e−011
18th surface k = 0.0000
A4 = −2.4335e−004, A6 = −4.1268e−006, A8 = 8.8748e−008
19th surface k = 0.0000
A4 = 7.0518e−005, A6 = −3.4462e−006, A8 = 1.4111e−007
22th surface k = 0.0000
A4 = −8.8896e−005, A6 = −1.2543e−006, A8 = −1.1031e−007,
A10 = 1.2161e−009
23th surface k = 0.0000
A4 = −9.4396e−005, A6 = 1.3516e−006, A8 = −1.4983e−007,
A10 = 2.0318e−009
24th surface k = 0.0000
A4 = −5.8420e−005, A6 = 5.2220e−007, A8 = −1.0130e−009,
A10 = −2.0570e−012
25th surface k = 0.0000
A4 = −2.7676e−005, A6 = 2.3776e−007, A8 = 8.3898e−010,
A10 = −4.3955e−012

Zoom data

| | WE | ST | TE |
|---|---|---|---|
| f | 13.008 | 34.908 | 85.975 |
| Fno. | 3.427 | 5.256 | 6.248 |
| 2ω | 87.1 | 34.6 | 14.5 |
| IH | 11.15 | 11.15 | 11.15 |
| FB | 15.405 | 15.405 | 15.405 |
| Lens total length (mm) | 62.457 | 84.326 | 102.958 |
| d5 | 0.800 | 13.975 | 30.372 |
| d11 | 14.973 | 6.995 | 2.300 |

-continued

| Unit mm | | | |
|---|---|---|---|
| d19 | 2.504 | 5.173 | 7.699 |
| d23 | 2.005 | 16.009 | 20.413 |

Unit focal length f1 = 66.5693  f2 = −9.17631  f3 = 13.0359  f4 = −19.3351
f5 = 40.2516

Example 6

| Unit mm | | | | |
|---|---|---|---|---|
| Surface data | | | | |
| Surface no. | r | d | nd | vd |
| Object plane | ∞ | ∞ | | |
| 1 | 50.565 | 1.100 | 1.84666 | 23.78 |
| 2 | 35.029 | 4.737 | 1.60300 | 65.44 |
| 3 | 124.412 | 0.117 | | |
| 4 | 38.826 | 4.135 | 1.59282 | 68.63 |
| 5 | 148.038 | Variabl | | |
| 6 | 137.051 | 0.700 | 1.88300 | 40.76 |
| 7 | 10.136 | 3.005 | | |
| 8* | −20.381 | 0.700 | 1.72903 | 54.04 |
| 9* | 88.392 | 0.100 | | |
| 10 | 20.302 | 1.800 | 1.94595 | 17.98 |
| 11 | 74.404 | Variabl | | |
| 12* | 9.017 | 3.288 | 1.58313 | 59.38 |
| 13* | 51.953 | 0.493 | | |
| 14 (Stop) | ∞ | 0.200 | | |
| 15 | 11.237 | 3.253 | 1.49700 | 81.61 |
| 16 | −14.346 | 0.500 | 1.90366 | 31.32 |
| 17 | 26.641 | 0.143 | | |
| 18* | 10.827 | 1.800 | 1.73077 | 40.51 |
| 19* | 39.424 | Variabl | | |
| 20* | −238.855 | 0.685 | 1.53071 | 55.69 |
| 21* | 9.768 | Variabl | | |
| 22* | −63.044 | 4.680 | 1.53071 | 55.69 |
| 23* | −16.643 | | | |
| Image plane (Image pickup surface) | ∞ | | | |

Aspherical surface data

8th surface k = 0.0000
A4 = −2.5279e−004, A6 = 9.4267e−006, A8 = −1.9601e−007,
A10 = 1.8863e−009
9th surface k = 0.0000
A4 = −2.1399e−004, A6 = 9.9858e−006, A8 = −2.1128e−007,
A10 = 2.1334e−009
12th surface k = 0.0000
A4 = −4.4397e−005, A6 = −1.8044e−007, A8 = −6.5472e−009,
A10 = −7.2110e−010, A12 = −2.6395e−012
13th surface k = 0.0000
A4 = −2.4019e−004, A6 = 1.5737e−006, A8 = −7.9213e−008,
A10 = 1.6915e−009, A12 = −3.5985e−011
18th surface k = 0.0000
A4 = −3.1055e−004, A6 = 1.5189e−006, A8 = −8.9480e−008
19th surface k = 0.0000
A4 = 4.7466e−004, A6 = 1.4171e−006, A8 = 2.4253e−007

-continued

Unit mm

20th surface k = 0.0000
A4 = −7.0010e−005, A6 = −1.5371e−005, A8 = 3.7198e−007,
A10 = −1.5069e−009
21th surface k = 0.0000
A4 = −4.7854e−005, A6 = −1.7502e−005, A8 = 2.5789e−007,
A10 = 8.9730e−011
22th surface k = 0.0000
A4 = 7.8257e−006, A6 = 5.4763e−007, A8 = −6.3900e−010,
A10 = −1.6289e−011
23th surface k = 0.0000
A4 = 8.3895e−006, A6 = 9.8844e−008, A8 = 5.5073e−009,
A10 = −3.3714e−011

Zoom data

|  | WE | ST | TE |
| --- | --- | --- | --- |
| f | 14.313 | 35.034 | 97.932 |
| Fno. | 3.838 | 5.356 | 6.301 |
| 2ω | 82.7 | 34.3 | 12.7 |
| IH | 11.15 | 11.15 | 11.15 |
| FB | 14.199 | 14.199 | 14.199 |
| Lens total length (mm) | 53.443 | 67.154 | 83.442 |
| d5 | 0.823 | 11.615 | 27.800 |
| d11 | 15.925 | 7.410 | 0.500 |
| d19 | 1.183 | 3.377 | 5.990 |
| d21 | 4.076 | 13.318 | 17.716 |

Unit focal length f1 = 61.6385  f2 = −10.8519  f3 = 11.8568  f4 = −17.6652
f5 = 41.1673

Aberration diagrams of the examples from the example 1 to the example 6 at the time of focusing on the infinite object point are shown in diagrams from FIG. 7A to FIG. 7L to FIG. 12A to FIG. 12L. FIG. 7A, FIG. 8A, FIG. 9A, FIG. 10A, FIG. 11A, and FIG. 12A show a spherical aberration (SA) at a telephoto end, FIG. 7B, FIG. 8B, FIG. 9B, FIG. 10B, FIG. 11B, and FIG. 12B show an astigmatism (AS) at the telephoto end, FIG. 7C, FIG. 8C, FIG. 9C, FIG. 10C, FIG. 11C, and FIG. 12C show a distortion (DT) at the telephoto end, and FIG. 7D, FIG. 8D, FIG. 9D, FIG. 10D, FIG. 11D, and FIG. 12D show a chromatic aberration of magnification (CC) at the telephoto end.

FIG. 7E, FIG. 8E, FIG. 9E, FIG. 10E, FIG. 11E, and FIG. 12E show a spherical aberration (SA) at an intermediate focal length state, FIG. 7F, FIG. 8F, FIG. 9F, FIG. 10F, FIG. 11F, and FIG. 12F show an astigmatism (AS) at the intermediate focal length state, FIG. 7G, FIG. 8G, FIG. 9G, FIG. 10G, FIG. 11G, and FIG. 12G show a distortion (DT) at the intermediate focal length state, and FIG. 7H, FIG. 8H, FIG. 9H, FIG. 10H, FIG. 11H, and FIG. 12H show a chromatic aberration of magnification (CC) at the intermediate focal length state.

FIG. 7I, FIG. 8I, FIG. 9I, FIG. 10I, FIG. 11I, and FIG. 12I show a spherical aberration (SA) at a wide angle end, FIG. 7J, FIG. 8J, FIG. 9J, FIG. 10J, FIG. 11J, and FIG. 12J show an astigmatism (AS) at the wide angle end, FIG. 7K, FIG. 8K, FIG. 9K, FIG. 10K, FIG. 11K, and FIG. 12K show a distortion (DT) at the wide angle end, and FIG. 7L, FIG. 8L, FIG. 9L, FIG. 10L, FIG. 11L, and FIG. 12L show a chromatic aberration of magnification (CC) at the telephoto end. In each diagram, 'FIY' denotes the maximum image height, and 'ω' denotes a half angle of view.

Next, values in conditional expressions from conditional expressions (1) to conditional expression (21) for each example are given below. Here, the specific gravity is a value (g/cm$^3$) for the negative lens in the second negative lens unit. A material name indicated by 'COP' is a cyclo-olefin polymer.

| Conditional expression | Example 1 | Example 2 | Example 3 |
| --- | --- | --- | --- |
| (1) $\Sigma_{1P}/ER_S$ | 1.729 | 1.985 | 1.965 |
| (2) $\Sigma_{1P}/f_w$ | 0.552 | 0.668 | 0.879 |
| (3) $SF_{2N}$ | 0.525 | 0.021 | 1.017 |
| (4) $|f_{2N}/f_{1P}|$ | 1.444 | 1.710 | 1.454 |
| (5) $\Sigma_{1P}/IH_{MAX}$ | 0.705 | 0.857 | 0.965 |
| (6) $\Sigma_{1P}/IH_{33w}$ | 0.915 | 1.118 | 1.445 |
| (7) $\Sigma_{1P}/f_{1P}$ | 0.581 | 0.652 | 0.696 |
| (8) $f_{UN1P1}/IH_{MAX}$ | 1.324 | 1.25 | 1.546 |
| (9) $f_{UN1P1}/IH_{33w}$ | 1.717 | 1.632 | 2.316 |
| (10) $f_{UN1P1}/f_w$ | 1.036 | 0.975 | 1.408 |
| (11) $|f_{2N}/IH_{MAX}|$ | 1.752 | 2.248 | 2.014 |
| (12) $|f_{2N}/IH_{33w}|$ | 2.273 | 2.933 | 3.017 |
| (13) $|f_{2N}/f_w|$ | 1.372 | 1.753 | 1.835 |
| (14) $f_{1N}/f_{2N}$ | 0.962 | 0.724 | 0.801 |
| (15) $DT_w$ (%) | −10.56 | −13.07 | −11.10 |
| (16) $f_{1P}/f_w$ | 0.95 | 1.025 | 1.262 |
| Specific weight | 1.01 | 1.01 | 3.57 |
| Name of material | COP | COP | M-PCD4 |
| (17) $\nu_{p1}$ | 67.02 | 81.54 | 81.54 |
| (17) $\nu_{p1}$ |  |  |  |
| (17) $\nu_{p1}$ |  |  |  |
| (18) $fb_w/IH_{MAX}$ | 1.295 | 1.361 | 1.274 |
| (19) $SF_{UN1P1}$ | −1.211 | −0.676 | −1.182 |
| (20) $|ASP_O - ASP_I|/IH_{33W}$ |  | 0.0014 | 0.0057 |
| (21) $f_t/f_w$ | 2.892 | 2.907 | 3.987 |

| Conditional expression | Example 4 | Example 5 | Example 6 |
| --- | --- | --- | --- |
| (1) $\Sigma_{1P}/ER_S$ | 2.038 | 2.097 | 2.2 |
| (2) $\Sigma_{1P}/f_w$ | 0.916 | 0.759 | 0.676 |
| (3) $SF_{2N}$ | 1.017 | −0.202 | −0.63 |
| (4) $|f_{2N}/f_{1P}|$ | 1.453 | 1.483 | 1.49 |
| (5) $\Sigma_{1P}/IH_{MAX}$ | 1.001 | 0.886 | 0.87 |
| (6) $\Sigma_{1P}/IH_{33w}$ | 1.502 | 1.271 | 1.125 |
| (7) $\Sigma_{1P}/f_{1P}$ | 0.722 | 0.758 | 0.816 |
| (8) $f_{UN1P1}/IH_{MAX}$ | 1.543 | 1.982 | 1.632 |
| (9) $f_{UN1P1}/IH_{33w}$ | 2.315 | 2.844 | 2.12 |
| (10) $f_{UN1P1}/f_w$ | 1.411 | 1.699 | 1.271 |
| (11) $|f_{2N}/IH_{MAX}|$ | 2.014 | 1.734 | 1.58 |
| (12) $|f_{2N}/IH_{33w}|$ | 3.023 | 2.488 | 2.054 |
| (13) $|f_{2N}/f_w|$ | 1.843 | 1.486 | 1.234 |
| (14) $f_{1N}/f_{2N}$ | 0.801 | 0.475 | 0.614 |
| (15) $DT_w$ (%) | −10.58 | −9.83 | −11.48 |
| (16) $f_{1P}/f_w$ | 1.268 | 1.002 | 0.828 |
| Specific weight | 3.57 | 1.01 | 1.01 |
| Name of material | M-PCD4 | COP | COP |
| (17) $\nu_{p1}$ | 81.54 | 81.54 | 81.61 |
| (17) $\nu_{p1}$ |  | 81.61 |  |
| (17) $\nu_{p1}$ |  | 64.14 |  |
| (18) $fb_w/IH_{MAX}$ | 1.212 | 1.382 | 1.273 |
| (19) $SF_{UN1P1}$ | −1.182 | −1.191 | −1.420 |
| (20) $|ASP_O - ASP_I|/IH_{33W}$ |  |  |  |
| (21) $f_t/f_w$ | 4.020 | 6.609 | 6.842 |

(Digital Camera)

Figure 15:
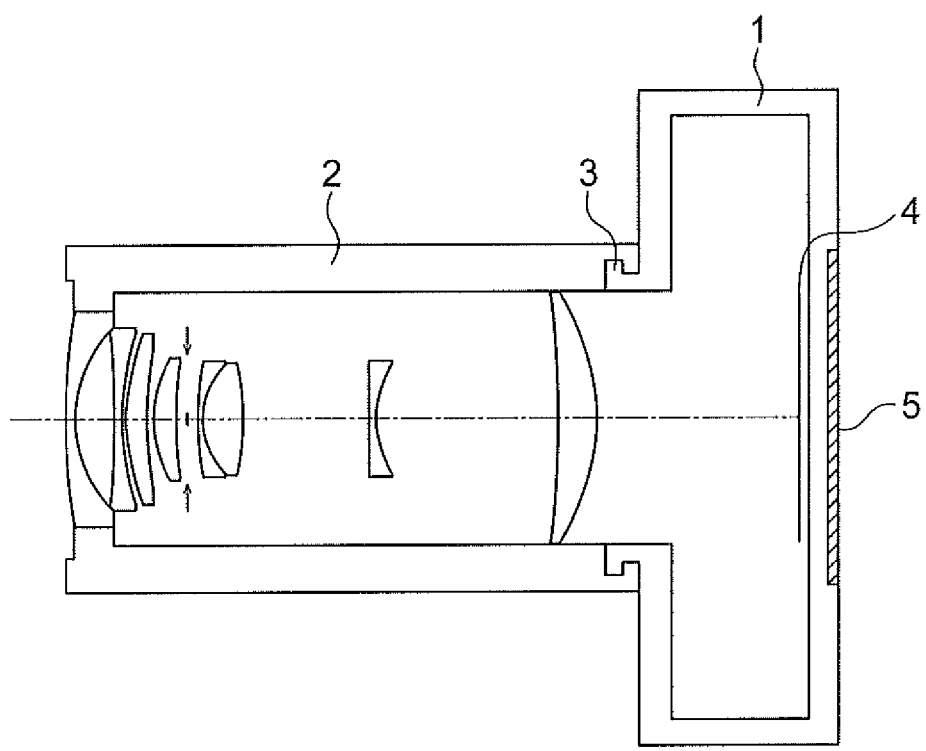
FIG. 15 is a cross-sectional view of a digital camera as an image pickup apparatus.

FIG. 15 is a cross-sectional view of a single-lens mirrorless camera as an image pickup apparatus. In FIG. 15, a taking lens system 2 is disposed inside a lens barrel of a single-lens mirrorless camera 1. Amount portion 3 enables the taking lens system 2 to be detachable from a body of the single-lens mirrorless camera 1. As the mount portion 3, a mount such as a screw-type mount and a bayonet-type mount is to be used. In this example, a bayonet-type mount is used. Moreover, an image pickup element surface 4 and a back monitor 5 are disposed in the body of the single-lens mirrorless camera 1. As an image pickup element, an element such as a small-size CCD (charge coupled device) or a CMOS (complementary metal-oxide semiconductor) is to be used.

Moreover, as the taking lens system 2 of the single-lens mirrorless camera 1, the zoom lens according to the present invention described in any one of the examples from the first example to the sixth example is to be used.

Figure 16:
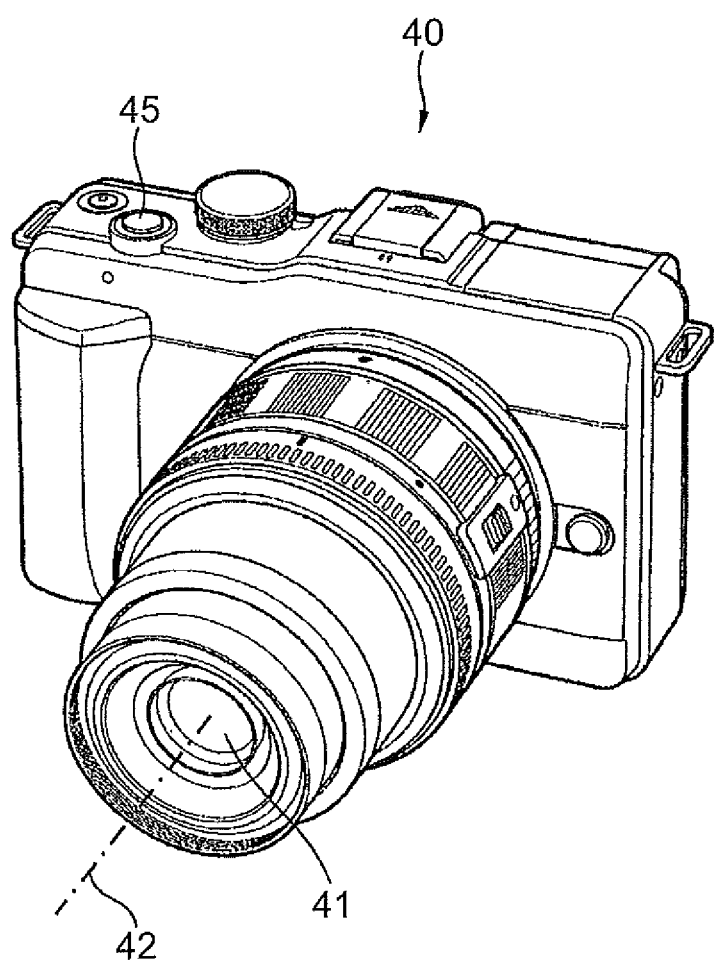
FIG. 16 is a front perspective view showing an appearance of the digital camera as an image pickup apparatus.
Figure 17:
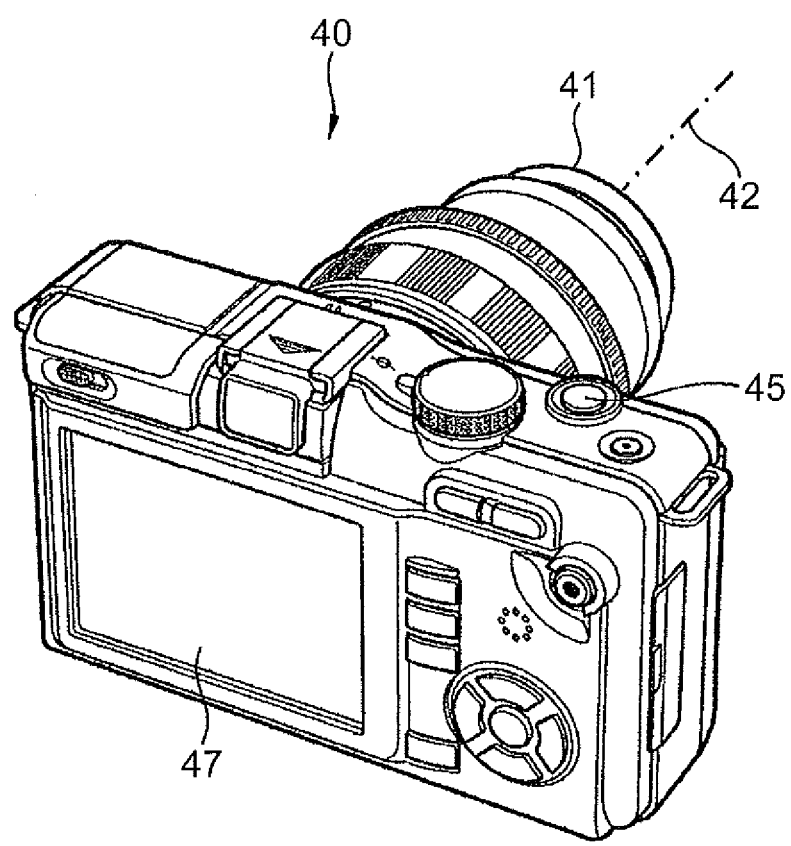
FIG. 17 is a rear perspective view showing an appearance of the digital camera as an image pickup apparatus.
Figure 18:
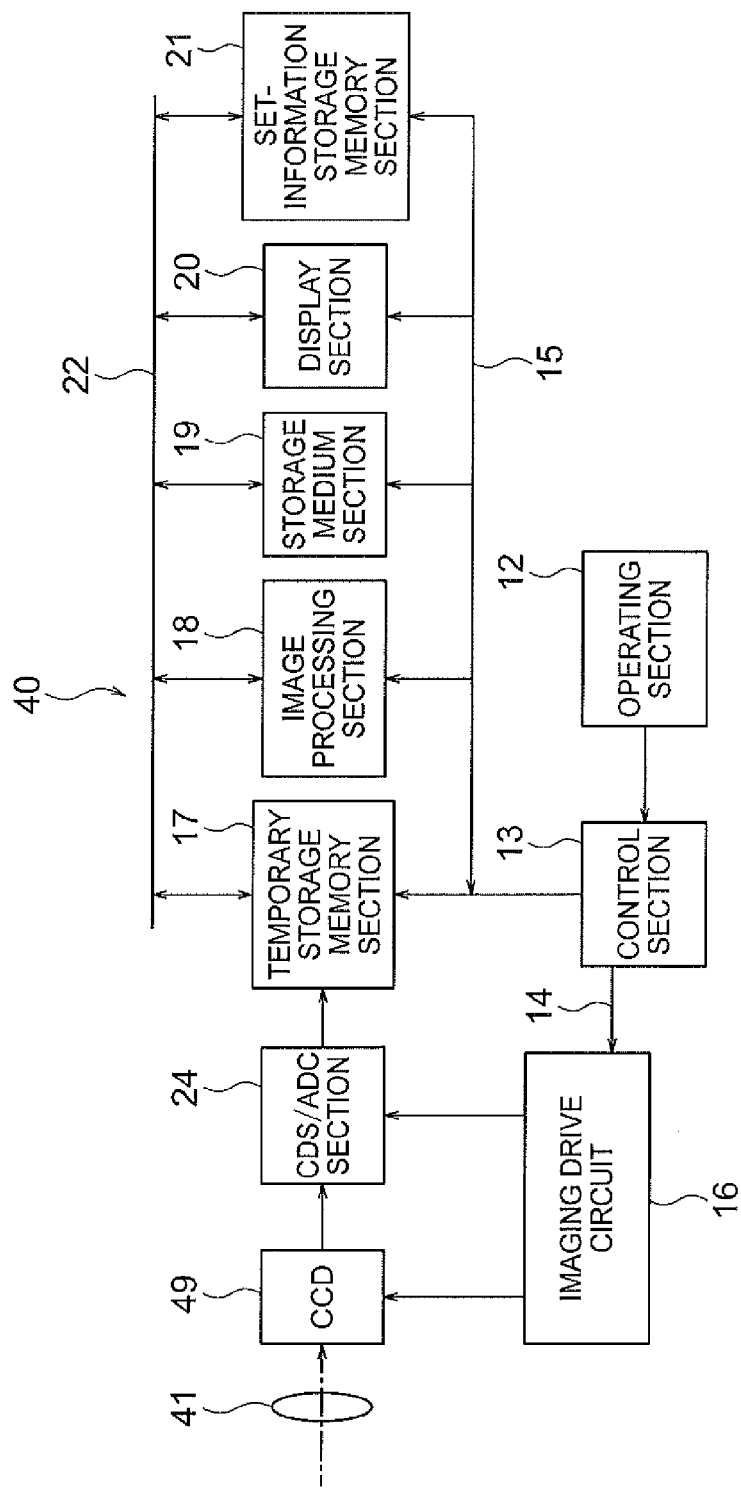
FIG. 18 is a block diagram showing an internal circuit of main components of the digital camera.

FIG. 16 and FIG. 17 are conceptual diagrams of an arrangement of the image pickup apparatus according to the present invention. FIG. 16 is a front perspective view showing an appearance of a digital camera 40 as the image pickup apparatus, and FIG. 18 is a rear perspective view of the digital camera 40. The zoom lens according to the present invention is used in a photographic optical system 41 of the digital camera 40.

The digital camera 40 according to the present embodiment includes the photographic optical system 41 which is positioned in a photographic optical path 42, a shutter button 45, and a liquid-crystal display monitor 47. As the shutter button 45 disposed on an upper portion of the digital camera 40 is pressed, in conjunction with the pressing of the shutter button 45, photography is carried out by the photographic optical system 41 such as the zoom lens according to the first example. An object image which is formed by the photographic optical system 41 is formed on an image pickup element (photoelectric conversion surface) which is provided near an image forming surface. The object image which has been received optically by the image pickup element is displayed on the liquid-crystal display monitor 47 which is provided to a rear surface of the camera, as an electronic image by a processing means. Moreover, it is possible to record the electronic image which has been photographed, in a recording means.

(Internal Circuit Structure)

FIG. 18 is a structural block diagram of an internal circuit of main components of the digital camera 40. In the following description, the processing means described above includes for instance, a CDS/ADC section 24, a temporary storage memory 17, and an image processing section 18, and a storage means consists of a storage medium section 19 for example.

As shown in FIG. 18, the digital camera 40 includes an operating section 12, a control section 13 which is connected to the operating section 12, the temporary storage memory 17 and an imaging drive circuit 16 which are connected to a control-signal output port of the control section 13, via a bus 14 and a bus 15, the image processing section 18, the storage medium section 19, a display section 20, and a set-information storage memory section 21.

The temporary storage memory 17, the image processing section 18, the storage medium section 19, the display section 20, and the set-information storage memory section 21 are structured to be capable of mutually inputting and outputting data via a bus 22. Moreover, the CCD 49 and the CDS/ADC section 24 are connected to the imaging drive circuit 16.

The operating section 12 includes various input buttons and switches, and informs the control section 13 of event information which is input from outside (by a user of the digital camera) via these input buttons and switches. The control section 13 is a central processing unit (CPU), and has a built-in computer program memory which is not shown in the diagram. The control section 13 controls the entire digital camera 40 according to a computer program stored in this computer program memory.

The CCD 49 is driven and controlled by the imaging drive circuit 16, and which converts an amount of light for each pixel of the object image which formed through the photographic optical system 41 to an electric signal, and outputs to the CDS/ADC section 24.

The CDS/ADC section 24 is a circuit which amplifies the electric signal which is input from the CCD 49, and carries out analog/digital conversion, and outputs to the temporary storage memory 17 image raw data (Bayer data, hereinafter called as 'RAW data') which is only amplified and converted to digital data.

The temporary storage memory 17 is a buffer which includes an SDRAM (Synchronous Dynamic Random Access Memory) for example, and is a memory device which stores temporarily the RAW data which is output from the CDS/ADC section 24. The image processing section 18 is a circuit which reads the RAW data stored in the temporary storage memory 17, or the RAW data stored in the storage medium section 19, and carries out electrically various image-processing including the distortion correction, based on image-quality parameters specified by the control section 13.

The storage medium section 19 is a recording medium in the form of a card or a stick including a flash memory for instance, detachably mounted. The storage medium section 19 records and maintains the RAW data transferred from the temporary storage memory 17 and image data subjected to image processing in the image processing section 18 in the card flash memory and the stick flash memory.

The display section 20 includes the liquid-crystal display monitor, and displays images and operation menu on the liquid-crystal display monitor. The set-information storage memory section 21 includes a ROM section in which various image quality parameters are stored in advance, and a RAM section which stores image quality parameters which are selected by an input operation on the operating section 12, from among the image quality parameters which are read from the ROM section.

The digital camera 40 arranged in such manner, by adopting a zoom lens, while having a wide angle of view and a small size, can be let to be an image pickup apparatus that is capable of achieving an image with a high resolution without allowing degradation of an image quality.

The zoom lens of the present invention can also be used in an image pickup apparatus of a type in which, an optical system is fixed to a main body of the image pickup apparatus.

The zoom lens according to the present invention shows an effect that it is possible to secure an optical performance even when widening of angle of view and small-sizing are carried out.

In such manner, the zoom lens according to the present invention, and the image pickup apparatus using the zoom lens are useful for small-sizing and securing the optical performance, while having a high zooming ratio.

What is claimed is:

1. A zoom lens comprising:
   a first positive lens unit having a positive refractive power;
   a first negative lens unit having a negative refractive power, which is disposed immediately before an object side of the first positive lens unit;
   a second negative lens unit having a negative refractive power, which is disposed immediately after an image side of the first positive lens unit; and
   a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, an object-side sub-lens unit and an image-side sub-lens unit, and an aperture stop is disposed between the object-side sub-lens unit and the image-side sub-lens unit, and the first negative lens unit includes a negative lens and a positive lens, and a refracting surface nearest to the image in the first negative lens unit is concave toward the image side, and a refracting surface nearest to the object in the second positive lens unit is concave toward the object side, and a refracting surface nearest to the image in the second positive lens unit is convex toward the image side, and the following conditional expression (1) is satisfied:

$$1.2<\Sigma_{1P}/ER_S<2.7 \tag{1}$$

where, $\Sigma_{1P}$ denotes a thickness on an optical axis of the first positive lens unit, and $ER_S$ denotes a maximum radius of an opening portion of the aperture stop.

2. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and
a second positive lens unit which is disposed nearest to an image, wherein
at the time of zooming from a wide angle end to a telephoto end, each of a distance between the first positive lens unit and the first negative lens unit and a distance between the second negative lens unit and the second positive lens unit changes, and
a distance between the first positive lens unit and the second negative lens unit widens more at the telephoto end than at the wide angle end, and
the first positive lens unit includes in order from the object side to the image side, an object-side sub-lens unit and an image-side sub-lens unit, and
an aperture stop is disposed between the object-side sub-lens unit and the image-side sub-lens unit, and
the first negative lens unit includes a negative lens and a positive lens, and a refracting surface nearest to the image in the first negative lens unit is concave toward the image side, and
a refracting surface nearest to the object in the second positive lens unit is concave toward the object side, and a refracting surface nearest to the image in the second positive lens unit is convex toward the image side, and
the following conditional expression (2) is satisfied:

$$0.4<\Sigma_{1P}/f_w<1.2 \tag{2}$$

where, $\Sigma_{1P}$ denotes a thickness on an optical axis of the first positive lens unit, and $f_w$ denotes a focal length of the overall zoom lens system at the time of focusing on an axial infinite object point at the wide angle end.

3. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and
a second positive lens unit which is disposed nearest to an image, wherein
at the time of zooming from a wide angle end to a telephoto end, each of a distance between the first positive lens unit and the first negative lens unit and a distance between the second negative lens unit and the second positive lens unit changes, and
a distance between the first positive lens unit and the second negative lens unit widens more at the telephoto end than at the wide angle end, and
the first positive lens unit includes in order from the object side to the image side, an object-side sub-lens unit and an image-side sub-lens unit, and
an aperture stop is disposed between the object-side sub-lens unit and the image-side sub-lens unit, and
a refracting surface nearest to the image in the first negative lens unit is concave toward the image side, and
the first negative lens unit includes in order from the object side to the image side, an object-side sub-lens unit that includes a first negative lens, and an image-side sub-lens unit that includes a second negative lens and a first positive lens, and
the following conditional expressions (1) and (3) are satisfied:

$$1.2<\Sigma_{1P}/ER_S<2.7 \tag{1}$$

$$-0.9<SF_{2N}<1.5 \tag{3}$$

where, $\Sigma_{1P}$ denotes a thickness on an optical axis of the first positive lens unit, $ER_S$ denotes a maximum radius of an opening portion of the aperture stop, $$SF_{2N}=(R_{2NO}+R_{2NI})/(R_{2NO}+R_{2NI}),$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit.

4. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and
a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, an object-side sub-lens unit and an image-side sub-lens unit, and an aperture stop is disposed between the object-side sub-lens unit and the image-side sub-lens unit, and a refracting surface nearest to the image side in the first negative lens unit is concave toward the image side, and the first negative lens unit includes in order from the object side to the image side, an object-side sub-lens unit which includes a first negative lens, and an image-side sub-lens unit which includes a second negative lens and a first positive lens, and the following conditional expressions (2) and (3) are satisfied:

$$0.4<\Sigma_{1P}/f_w<1.2 \qquad (2)$$

$$-0.9<SF_{2N}<1.5 \qquad (3)$$

where, $\Sigma_{1P}$ denotes a thickness on an optical axis of the first positive lens unit, $f_w$ denotes a focal length of the overall zoom lens system at the time of focusing on an axial infinite object point at the wide angle end, $$SF_{2N}=(R_{2NO}+R_{2NI})/(R_{2NO}+R_{2NI}),$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit.

5. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and
a second positive lens unit which is disposed nearest to an image, wherein
at the time of zooming from a wide angle end to a telephoto end, each of a distance between the first positive lens unit and the first negative lens unit and a distance between the second negative lens unit and the second positive lens unit changes, and
a distance between the first positive lens unit and the second negative lens unit widens more at the telephoto end than at the wide angle end, and
the first positive lens unit includes in order from the object side to the image side, an object-side sub-lens unit and an image-side sub-lens unit, and
an aperture stop is disposed between the object-side sub-lens unit and the image-side sub-lens unit, and the first negative lens unit includes a negative lens and a positive lens, and a refracting surface nearest to the image side in the first negative lens unit is concave toward the image side, and the following conditional expressions (1) and (4) are satisfied:

$$1.2<\Sigma_{1P}/ER_S<2.7 \qquad (1)$$

$$1.0<|f_{2N}/f_{1P}|<1.9 \qquad (4)$$

where, $\Sigma_{1P}$ denotes a thickness on an optical axis of the first positive lens unit, $ER_S$ denotes a maximum radius of an opening portion of the aperture stop, $f_{1P}$ denotes a focal length of the first positive lens unit, and $f_{2N}$ denotes a focal length of the second negative lens unit.

6. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and
a second positive lens unit which is disposed nearest to an image, wherein
at the time of zooming from a wide angle end to a telephoto end, each of a distance between the first positive lens unit and the first negative lens unit and a distance between the second negative lens unit and the second positive lens unit changes, and
a distance between the first positive lens unit and the second negative lens unit widens more at the telephoto end than at the wide angle end, and
the first positive lens unit includes in order from the object side to the image side, an object-side sub-lens unit and an image-side sub-lens unit, and
an aperture stop is disposed between the object-side sub-lens unit and the image-side sub-lens unit, and
the first negative lens unit includes a negative lens and a positive lens, and a refracting surface nearest to the image side in the first negative lens unit is concave toward the image side, and
the following conditional expressions (2) and (4) are satisfied $$0.4<\Sigma_{1P}/f_w<1.2 \qquad (2)$$

$$1.0<|f_{2N}/f_{1P}|<1.9 \qquad (4)$$

where, $\Sigma_{1P}$ denotes a thickness on an optical axis of the first positive lens unit, $f_w$ denotes a focal length of the overall zoom lens system at the time of focusing on an axial infinite object point at the wide angle end, $f_{1P}$ denotes a focal length of the first positive lens unit, and $f_{2N}$ denotes a focal length of the second negative lens unit.

7. A zoom lens comprising:
a first positive lens unit having a positive refractive power;
a first negative lens unit having a negative refractive power, which is disposed immediately before an object side of the first positive lens unit;
a second negative lens unit having a negative refractive power, which is disposed immediately after an image side of the first positive lens unit; and a second positive lens unit which is disposed nearest to an image, wherein at the time of zooming from a wide angle end to a telephoto end, each of a distance between the first positive lens unit and the first negative lens unit and a distance between the second negative lens unit and the second positive lens unit changes, and a distance between the first positive lens unit and the second negative lens unit widens more at the telephoto end than at the wide angle end, and the first positive lens unit includes in order from the object side to the image side, an object-side sub-lens unit and an image-side sub-lens unit, and an aperture stop is disposed between the object-side sub-lens unit and the image-side sub-lens unit, and a refracting surface nearest to the image side in the first negative lens unit is concave toward the image side, and the first negative lens unit includes in order from the object side to the image side, an object-side sub-lens unit that include a first negative lens, and an image-side sub-lens unit that includes a second negative lens and a first positive lens, and the following conditional expressions (3), (11-1), (13-1), and (19-1) are satisfied:

$$-0.9 < SF_{2N} < 1.5 \quad (3)$$

$$0.8 < |f_{2N}/IH_{MAX}| < 2.7 \quad (11\text{-}1)$$

$$1.1 < |f_{2N}/f_w| < 2.4 \quad (13\text{-}1)$$

$$-2.0 < SF_{UN1P1} < 0.0 \quad (19\text{-}1)$$

where, $$SF_{2N} = (R_{2NO} + R_{2NI})(R_{2NO} + R_{2NI}),$$

where, $R_{2NO}$ denotes a paraxial radius of curvature of the object-side surface of the second negative lens in the first negative lens unit, and $R_{2NI}$ denotes a paraxial radius of curvature of the image-side surface of the second negative lens in the first negative lens unit, and $f_{2N}$ denotes a focal length of the second negative lens unit, $f_w$ denotes a focal length of the overall zoom lens system at the time of focusing on an axial infinite object point at the wide angle end, $IH_{MAX}$ denotes a maximum image height of the zoom lens, and is a maximum value when it changes, $$SF_{UN1P1} = (R_{Un1P1O} + R_{UN1P1I})/(R_{Un1P1O} - R_{UN1P1I})$$

where, $R_{UN1P1O}$ denotes a paraxial radius of curvature of an object-side surface of the object-side sub-lens unit in the first positive lens unit, and $R_{UN1P1I}$ denotes a paraxial radius of curvature of an image-side surface of the object-side sub-lens unit in the first positive lens unit.

8. The zoom lens according to claim 7, wherein the following conditional expression (2) is satisfied:

$$0.4 < \Sigma_{1P}/f_w < 1.2 \quad (2)$$

where, $\Sigma_{1P}$ denotes a thickness on the optical axis of the first positive lens unit, and $f_w$ denotes the focal length of the overall zoom lens system at the time of focusing on the axial infinite object point at the wide angle end.

9. The zoom lens according to claim 1, wherein any of the following conditional expressions (5), (6), and (7) is satisfied:

$$0.4 < \Sigma_{1P}/IH_{MAX} < 1.8 \quad (5)$$

$$0.45 < \Sigma_{1P}/IH_{33w} < 1.95 \quad (6)$$

$$0.4 < \Sigma_{1P}/f_{1P} < 1.0 \quad (7)$$

where, $\Sigma_{1P}$ denotes the thickness on an optical axis of the first positive lens unit, $IH_{MAX}$ denotes a maximum image height of the zoom lens, and is a maximum value when it changes, $IH_{33w}$ denotes a distance from an optical axis up to a position at which, a paraxial image plane intersects with a principal light ray when a light-incidence side half angle of view of the zoom lens at the time of focusing on an axial infinite object point at the wide angle end becomes 33°, and $f_{1P}$ denotes a focal length of the first positive lens unit.

10. The zoom lens according to claim 1, wherein any of the following conditional expressions (8), (9), and (10) is satisfied:

$$0.7 < f_{UN1P1}/IH_{MAX} < 2.8 \quad (8)$$

$$1.0 < f_{UN1P1}/IH_{33w} < 3.5 \quad (9)$$

$$0.7 < f_{UN1P1}/f_w < 2.0 \quad (10)$$

where, $f_{UN1P1}$ denotes a focal length of the object-side sub-lens unit in the first positive lens unit, $IH_{MAX}$ denotes a maximum image height of the zoom lens, and is a maximum height when it changes, $IH_{33w}$ denotes a distance from an optical axis up to a position at which, a paraxial image plane intersects with a principal light ray when a light-incidence side half angle of view of the zoom lens at the time of focusing on an axial infinite object point at the wide angle end becomes 33°, and $f_w$ denotes a focal length of the overall zoom lens system at the time of focusing on an axial infinite object point at the wide angle end.

11. The zoom lens according to claim 1, wherein the zoom lens satisfies the following conditional expressions (11), (12), and (13):

$$0.8 < |f_{2N}/IH_{MAX}| < 3.6 \quad (11)$$

$$1.5 < |f_{2N}/IH_{33w}| < 4.1 \quad (12)$$

$$1.0 < |f_{2N}/f_w| < 2.4 \quad (13)$$

where, $f_{2N}$ denotes a focal length of the second negative lens unit, $IH_{MAX}$ denotes a maximum image height of the zoom lens, and is a maximum height when it changes, $IH_{33w}$ denotes a distance from an optical axis up to a position at which, a paraxial image plane intersects with a principal light ray when a light-incidence side half angle of view of the zoom lens at the time of focusing on an axial infinite object point at the wide angle end becomes 33°, and $f_w$ denotes a focal length of the overall zoom lens system at the time of focusing on the axial infinite object point at the wide angle end.

12. The zoom lens according to claim 1, wherein
the object-side sub-lens unit in the first positive lens unit includes a positive lens, and
the image-side sub-lens unit in the first positive lens unit includes a positive lens.

13. The zoom lens according to claim 12, wherein the image-side sub-lens unit in the first positive lens unit includes a lens surface having a negative refractive power, and a positive lens that is disposed on an image side of the lens surface having a negative refractive power.

14. The zoom lens according to claim 1, wherein
the object-side sub-lens unit in the first positive lens unit includes one lens component having a positive refractive power, and
the image-side sub-lens unit in the first positive lens unit includes one lens component, and
only an object-side surface and an image-side surface of each of the lens component in the object-side sub-lens unit and the lens component in the image-side sub-lens unit are in contact with air, and
the total number of lens components in the first positive lens unit is two.

15. The zoom lens according to claim 1, wherein the following conditional expression (14) is satisfied:

$$0.35 < f_{1N}/f_{2N} < 1.2 \tag{14}$$

where,
$f_{1N}$ denotes a focal length of the first negative lens unit, and
$f_{2N}$ denotes a focal length of the second negative lens unit.

16. The zoom lens according to claim 1, wherein the following conditional expression (15) is satisfied:

$$-20.0\% < DT_w < -6.0\% \tag{15}$$

where, $$DT_w = \{IW_w - f_w \times \tan(\omega_w)\}/\{f_w \times \tan(\omega_w)\} \times 100(\%),$$

where,
$f_w$ denotes a focal length of the overall zoom lens system at the time of focusing on an axial infinite object point at the wide angle end,
$IH_w$ denotes a maximum image height of the zoom lens at the time of focusing on an axial infinite object point at the wide angle end, and
$\omega_w$ denotes a half angle of view at the time of focusing on an axial infinite object point at the wide angle end of the zoom lens.

17. The zoom lens according to claim 1, wherein the following conditional expression (4') is satisfied:

$$1.1 < |f_{2N}/f_{1P}| < 1.9 \tag{4'}$$

where,
$f_{1P}$ denotes a focal length of the first positive lens unit, and
$f_{2N}$ denotes a focal length of the second negative lens unit.

18. The zoom lens according to claim 1, wherein the following conditional expression (4") is satisfied:

$$1.2 < |f_{2N}/f_{1P}| < 1.9 \tag{4"}$$

where,
$f_{1P}$ denotes a focal length of the first positive lens unit, and
$f_{2N}$ denotes a focal length of the second negative lens unit.

19. The zoom lens according to claim 1, wherein the first negative lens unit includes in order from the object side to the image side, an object-side sub-lens unit and an image-side sub-lens unit,
the object-side sub-lens unit includes the negative lens as a first negative lens, and the image-side sub-lens unit includes another negative lens as a second negative lens and the positive lens as a first positive lens.

20. The zoom lens according to claim 19, wherein the following conditional expression (3) is satisfied:

$$-0.9 < SF_{2N} < 1.5 \tag{3}$$

where, $$SF_{2N} = (R_{2NO} + R_{2NI})/(R_{2NO} - R_{2NI}),$$

where,
$R_{2NO}$ denotes a paraxial radius of curvature of the object-side surface of the second negative lens in the first negative lens unit, and
$R_{2NI}$ denotes a paraxial radius of curvature of the image-side surface of the second negative lens in the first negative lens unit.

21. The zoom lens according to claim 1, wherein
a refracting surface nearest to an object in the second positive lens unit is concave toward the object side, and
a refracting surface nearest to an image in the second positive lens unit is convex toward the image side.

22. The zoom lens according to claim 1, wherein the following conditional expression (2) is satisfied:

$$0.4 < \Sigma_{1P}/f_w < 1.2 \tag{2}$$

where,
$\Sigma_{1P}$ denotes the thickness on the optical axis of the first positive lens unit, and
$f_w$ denotes a focal length of the overall zoom lens system at the time of focusing on the axial infinite object point at the wide angle end.

23. The zoom lens according to claim 1, wherein the following conditional expression (16) is satisfied:

$$0.7 < f_{1P}/f_w < 1.5 \tag{16}$$

where,
$f_{1P}$ denotes a focal length of the first positive lens unit, and
$f_w$ denotes a focal length of the overall zoom lens system at the time of focusing on the axial infinite object point at the wide angle end.

24. The zoom lens according to claim 1, wherein the second positive lens unit is disposed immediately after the image side of the second negative lens unit.

25. The zoom lens according to claim 1, wherein the second negative lens unit includes a negative lens having a specific gravity larger than 0.9 g/cm³ and smaller than 1.3 g/cm³.

26. The zoom lens according to claim 1, wherein the first positive lens unit includes a negative lens, and a positive lens that satisfies the following conditional expression (17):

$$63 < \nu_{p1} < 96 \tag{17}$$

where,
$\nu_{p1}$ denotes Abbe's number with reference to a d-line of one of the positive lenses in the first positive lens unit.

27. The zoom lens according to one of claims 1 and 5, wherein the following conditional expression (18) is satisfied:

$$0.6 < fb_w/IH_{MAX} < 1.8 \tag{18}$$

where,
$fb_w$ denotes an air-converted back focus of the zoom lens at the time of focusing on the axial infinite object point at the wide angle end, and
$IH_{MAX}$ denotes a maximum image height of the zoom lens, and is a maximum value when it changes.

28. A zoom lens according to claim 1, wherein the following conditional expression (19) is satisfied:

$$-2.0 < SF_{UN1P1} < 0.5 \quad (19)$$

where, $$SF_{UN1P1} = (R_{UN1P1O} + R_{UN1P1I})/(R_{UN1P1O} - R_{UN1P1I})$$

where, $R_{UN1P1O}$ denotes a paraxial radius of curvature of an object-side surface of the object-side sub-lens unit in the first positive lens unit, and $R_{UN1P1I}$ denotes a paraxial radius of curvature of an image-side surface of the object-side sub-lens unit in the first positive lens unit.

29. The zoom lens according to claim 1, wherein the zoom lens is a four-unit zoom lens in which the total number of lens units is four, and includes the first negative lens unit, the first positive lens unit, the second negative lens unit, and the second positive lens unit.

30. The zoom lens according to claim 1, wherein the zoom lens includes a third positive lens unit having a positive refractive power on the object side of the first negative lens unit, and at the time of zooming from the wide angle end to the telephoto end, a distance between the third positive lens unit and the first negative lens unit changes, and the zoom lens is a five-unit zoom lens in which the total number of lens units is five, and includes the third positive lens unit, the first negative lens unit, the first positive lens unit, the second negative lens unit, and the second positive lens unit.

31. The zoom lens according to claim 1, wherein the first negative lens unit includes a plastic aspheric lens that satisfies the following conditional expression (20):

$$0.0001 < ASP_O - ASP_I/IW_{33W} < 0.02 \quad (20)$$

where, $IH_{33W}$ denotes a distance from an optical axis up to a position at which, a paraxial image plane intersects with a principal light ray when a light-incidence side half angle of view of the zoom lens at the time of focusing on the axial infinite object point at the wide angle end becomes 330, $ASP_O$ denotes an amount of aspherical deviation at a position at which, a distance of an object-side surface of the plastic aspheric lens from an optical axis becomes $IH_{33W}$, and $ASP_I$ denotes an amount of aspherical deviation at a position at which, a distance of an image-side surface of the plastic aspheric lens from the optical axis becomes $IH_{33W}$, the amount of aspherical deviation is a distance along an optical axial direction from a reference spherical surface up to a target surface, and has a positive sign when the target surface is on the image side with respect to the reference spherical surface, and here, a vertex of the reference spherical surface is a vertex of the target surface, and a radius of curvature of the reference spherical surface is same as a paraxial radius of curvature of the target surface.

32. The zoom lens according to claim 1, wherein the object-side sub-lens unit in the first positive lens unit includes a single lens having a positive refractive power, and the image-side sub-lens unit in the first positive lens unit includes a cemented lens of a negative lens and a positive lens in order from the object side.

33. The zoom lens according to claim 1, wherein at the wide angle end, a light ray with a half angle of view of not less than 33° can pass through the zoom lens, and the following conditional expression (21) is satisfied:

$$2.6 < f_t/f_w < 13.0 \quad (21)$$

where, $f_t$ denotes a focal length of the overall zoom lens system at the time of focusing on an axial infinite object point s at the telephoto end, and $f_w$ denotes a focal length of the overall zoom lens system at the time of focusing on the axial infinite object point at the wide angle end.

34. The zoom lens according to one of claims 1 and 5, wherein the image-side sub-lens unit in the first positive lens unit includes a lens having a negative refractive power, and a positive lens that is disposed on the image side of the lens having a negative refractive power.

35. The zoom lens according to one of claims 1 and 5, wherein the following conditional expression (1-1) is satisfied:

$$1.2 < \Sigma_{1P}/ER_S < 2.3 \quad (1-1)$$

where, $\Sigma_{1P}$ denotes the thickness on then optical axis of the first positive lens unit, and $ER_S$ denotes the maximum radius of the opening portion of the aperture stop.

36. The zoom lens according to claim 1, wherein the following conditional expression (13-1) is satisfied:

$$1.1 < |f_{2N}/f_w| < 2.4 \quad (13-1)$$

where, $f_{2N}$ denotes a focal length of the second negative lens unit, and $f_w$ denotes a focal length of the overall zoom lens system at the time of focusing on the axial infinite object point at the wide angle end.

37. The zoom lens according to claim 5, wherein the following conditional expression (4-1) is satisfied:

$$1.3 < |f_{2N}/f_{1P}| < 1.9 \quad (4-1)$$

where, $f_{1P}$ denotes the focal length of the first positive lens unit, and $f_{2N}$ denotes the focal length of the second negative lens unit.

38. An image pickup apparatus comprising:

a zoom lens; and an image pickup element which has an image pickup surface, and which converts an image formed on the image pickup surface by the zoom lens to an electric signal, and the zoom lens is the zoom lens according to claim 1.

* * * * *